US012748677B2

(12) United States Patent
Fardig et al.

(10) Patent No.: US 12,748,677 B2
(45) Date of Patent: Sep. 29, 2026

(54) SCALED-DOWN LOAD TEST MODELS FOR TESTING REAL-WORLD LOADS

(71) Applicant: Lenovo (Singapore) Pte. Ltd., New Tech Park (SG)

(72) Inventors: Matthew Fardig, Boonville, IN (US); Sathish Kumar Ganesan, Morrisville, NC (US); Joshua Smith, Milton, NC (US); Timothy Robbins, Avon, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1022 days.

(21) Appl. No.: 17/528,055

(22) Filed: Nov. 16, 2021

(65) Prior Publication Data

US 2023/0153222 A1 May 18, 2023

(51) Int. Cl.
*G06F 11/34* (2006.01)
*G06N 20/20* (2019.01)

(52) U.S. Cl.
CPC ......... *G06F 11/3457* (2013.01); *G06N 20/20* (2019.01)

(58) Field of Classification Search
CPC ............. G06F 11/3457; G06F 11/3433; G06F 11/3414; G06N 20/20; G06N 20/00
See application file for complete search history.

(56) References Cited

U.S. PATENT DOCUMENTS

| | | | | |
|---|---|---|---|---|
| 9,251,035 B1 * | 2/2016 | Vazac | ...................... | H04L 67/02 |
| 9,396,039 B1 * | 7/2016 | Arguelles | .............. | G06F 9/5083 |
| 9,600,386 B1 * | 3/2017 | Thai | ......................... | H04L 41/12 |
| 2014/0122387 A1 * | 5/2014 | Chi | ........................... | G06N 5/04 706/12 |

(Continued)

OTHER PUBLICATIONS

S.Venkataraman et al., "Ernest: Efficient Performance Prediction for Large-Scale Advanced Analytics," 13th USENIX Symposium on Networked Systems Design and Implementation (NSDI '16), Mar. 2016. https://www.usenix.org/conference/nsdi16/ technical-sessions/ presentation/venkataraman (Year: 2016).*

(Continued)

*Primary Examiner* — Emerson C Puente
*Assistant Examiner* — Yi Hao
(74) *Attorney, Agent, or Firm* — Kunzler Needham Hilton

(57) ABSTRACT

Methods, systems, apparatus, and program products that can generate scaled-down load test models for testing real-world loads are disclosed herein. One method includes providing a test environment of a system including multiple nodes. The test environment includes virtual nodes corresponding to the system nodes and each virtual node functions under a virtual load similar to each corresponding node functioning under a real-world load. The method further includes utilizing a machine learning algorithm to repeatedly apply at least one virtual load to the virtual node(s) in the test environment until a scaled-down load test model mimicking the system under a pre-defined real-world load is generated. Here, the virtual load(s) applied to the virtual node(s) is/are compara- (Continued)

tively smaller relative to each of corresponding real-world loads for the node(s) defining the pre-defined real-world load. Systems, apparatus, and program products that include and/or perform the methods are also disclosed herein.

18 Claims, 16 Drawing Sheets

(56) References Cited

U.S. PATENT DOCUMENTS

| | | | | |
|---|---|---|---|---|
| 2015/0205888 | A1* | 7/2015 | He | G06F 9/455<br>703/22 |
| 2016/0014238 | A1* | 1/2016 | Massa | G06F 11/3612<br>714/33 |
| 2016/0078368 | A1* | 3/2016 | Kakhandiki | G06N 5/04<br>706/12 |
| 2018/0373885 | A1* | 12/2018 | Arad | G06F 21/6254 |
| 2019/0391850 | A1* | 12/2019 | Malaya | G06N 3/045 |
| 2021/0034403 | A1* | 2/2021 | Yun | G06F 9/5033 |
| 2021/0149744 | A1* | 5/2021 | Sharma | G06F 11/3006 |
| 2021/0319151 | A1* | 10/2021 | Chen | G06F 30/20 |
| 2021/0392049 | A1* | 12/2021 | Jeuk | H04L 41/0806 |

OTHER PUBLICATIONS

O. Ibidunmoye et al., "Performance Anomaly Detection and Bottleneck Identification," ACM Computing Surveys 48(1), Jun. 2015. DOI: http://dx.doi.org/10.1145/2791120 (Year: 2015).*

* cited by examiner

| REQUESTS | CPU | MEMORY | I/O |
|---|---|---|---|
| 10,000 | 1% | 12% | 2% |
| 50,000 | 5% | 23% | 3% |
| 100,000 | 18% | 30% | 29% |
| 500,000 | 53% | 70% | 36% |
| 1,000,000 | 72% | 100% | 100% |

| REQUESTS | CPU | MEMORY | I/O |
|---|---|---|---|
| 10 | 1% | 12% | 2% |
| 50 | 2% | 13% | 3% |
| 100 | 3% | 22% | 3% |
| 500 | 3% | 25% | 3% |
| 1,000 | 4% | 26% | 9% |

| REQUESTS | CPU | MEMORY | I/O |
|---|---|---|---|
| 10 | 1% | 12% | 2% |
| 50 | 5% | 13% | 3% |
| 100 | 18% | 22% | 3% |
| 500 | 19% | 25% | 3% |
| 1,000 | 72% | 26% | 9% |

| REQUESTS | CPU | MEMORY | I/O |
|---|---|---|---|
| 10 | 1% | 12% | 2% |
| 50 | 10% | 23% | 3% |
| 100 | 18% | 24% | 3% |
| 500 | 53% | 62% | 3% |
| 1,000 | 68% | 100% | 9% |

| REQUESTS | CPU | MEMORY | I/O |
|---|---|---|---|
| 10 | 1% | 12% | 2% |
| 50 | 10% | 23% | 3% |
| 100 | 18% | 24% | 24% |
| 500 | 53% | 62% | 30% |
| 1,000 | 68% | 100% | 98% |

SCALED-DOWN LOAD TEST MODELS FOR TESTING REAL-WORLD LOADS

FIELD

The subject matter disclosed herein relates to computing devices and more particularly relates to scaled-down load test models for testing real-world loads.

BACKGROUND

Systems and/or software services are often load tested to get an idea of how the systems and/or software services will behave in an environment. One goal of load testing is to identify any areas of the systems and/or software services that should be updated so that the systems and/or software services will respond more efficiently under various loads. However, it is often difficult to load test testing systems and/or software services under the same load as real-world systems and/or software services, especially real-world systems and/or software services that experience high loads and/or amounts of traffic, because a particular system and/or software service might not degrade until a high load is actually experienced by the particular system and/or software service. Attempting to simulate a particular system and/or software experiencing a high load is, from a practical standpoint, is difficult to replicate and/or cost prohibitive because, for example, high load testing often must run for long periods of time before negative/degrade symptoms appear.

BRIEF SUMMARY

Apparatus, methods, systems, and program products that can generate scaled-down load test models for testing real-world loads are disclosed herein. An apparatus, in one embodiment, includes a processor and a memory that stores code executable by the processor. In certain embodiments, the code is executable by the processor to provide a test environment of a system under test that includes a plurality of nodes. In some embodiments, the test environment includes a plurality of virtual nodes corresponding to the plurality of nodes and each virtual node functions under a virtual load similar to each corresponding node in the plurality of nodes functioning under a real-world load. The executable code further causes the processor to utilize a machine learning algorithm to repeatedly apply one or more different virtual loads to one or more virtual nodes in the test environment until a scaled-down load test model that mimics the system under a pre-defined real-world load is generated. Here, each of the one or more different virtual loads applied to each of the one or more virtual nodes is comparatively smaller relative to each of one or more corresponding real-world loads for each of one or more nodes defining the pre-defined real-world load.

One embodiment of a method that can generate scaled-down load test models for testing real-world loads includes providing, by a processor, a test environment of a system under test that includes a plurality of nodes. In certain embodiments, the test environment includes a plurality of virtual nodes corresponding to the plurality of nodes and each virtual node functions under a virtual load similar to each corresponding node in the plurality of nodes functioning under a real-world load. The method further includes utilizing a machine learning algorithm to repeatedly apply one or more different virtual loads to one or more virtual nodes in the test environment until a scaled-down load test model that mimics the system under a pre-defined real-world load is generated. Here, each of the one or more different virtual loads applied to each of the one or more virtual nodes is comparatively smaller relative to each of one or more corresponding real-world loads for each of one or more nodes defining the pre-defined real-world load.

A computer program product, in one embodiment, includes a computer-readable storage medium including program instructions embodied therewith. In certain embodiments, the program instructions are executable by a processor to cause the processor to provide a test environment of a system under test that includes a plurality of nodes. In certain embodiments, the test environment includes a plurality of virtual nodes corresponding to the plurality of nodes and each virtual node functions under a virtual load similar to each corresponding node in the plurality of nodes functioning under a real-world load. The program instructions further cause the processor to utilize a machine learning algorithm to repeatedly apply one or more different virtual loads to one or more virtual nodes in the test environment until a scaled-down load test model that mimics the system under a pre-defined real-world load is generated. Here, each of the one or more different virtual loads applied to each of the one or more virtual nodes is comparatively smaller relative to each of one or more corresponding real-world loads for each of one or more nodes defining the pre-defined real-world load.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
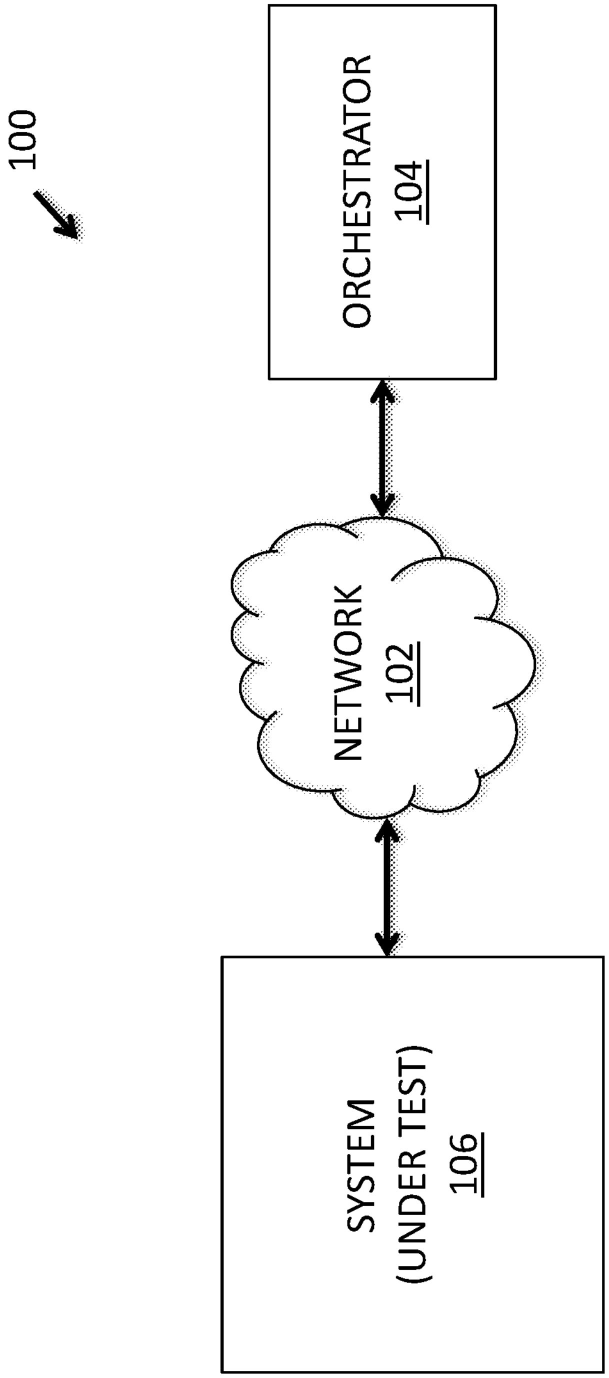
FIG. 1 is a schematic block diagram illustrating one embodiment of a system that can generate scaled-down load test models for testing real-world loads.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The various embodiments disclosed herein provide apparatus, methods, systems, and program products that can generate scaled-down load test models for testing real-world loads on systems and/or software services. An apparatus, in one embodiment, includes a processor and a memory that stores code executable by the processor. In certain embodiments, the code is executable by the processor to provide a test environment of a system under test that includes a plurality of nodes. In some embodiments, the test environment includes a plurality of virtual nodes corresponding to the plurality of nodes and each virtual node functions under a virtual load similar to each corresponding node in the plurality of nodes functioning under a real-world load. The executable code further causes the processor to utilize a machine learning algorithm to repeatedly apply one or more different virtual loads to one or more virtual nodes in the test environment until a scaled-down load test model that mimics the system under a pre-defined real-world load is generated. Here, each of the one or more different virtual loads applied to each of the one or more virtual nodes is comparatively smaller relative to each of one or more corresponding real-world loads for each of one or more nodes defining the pre-defined real-world load.

One embodiment of a method that can generate scaled-down load test models for testing real-world loads includes providing, by a processor, a test environment of a system under test that includes a plurality of nodes. In certain embodiments, the test environment includes a plurality of virtual nodes corresponding to the plurality of nodes and each virtual node functions under a virtual load similar to each corresponding node in the plurality of nodes functioning under a real-world load. The method further includes utilizing a machine learning algorithm to repeatedly apply one or more different virtual loads to one or more virtual nodes in the test environment until a scaled-down load test model that mimics the system under a pre-defined real-world load is generated. Here, each of the one or more different virtual loads applied to each of the one or more virtual nodes is comparatively smaller relative to each of one or more corresponding real-world loads for each of one or more nodes defining the pre-defined real-world load.

A computer program product, in one embodiment, includes a computer-readable storage medium including program instructions embodied therewith. In certain embodiments, the program instructions are executable by a processor to cause the processor to provide a test environment of a system under test that includes a plurality of nodes. In certain embodiments, the test environment includes a plurality of virtual nodes corresponding to the plurality of nodes and each virtual node functions under a virtual load similar to each corresponding node in the plurality of nodes functioning under a real-world load. The program instructions further cause the processor to utilize a machine learning algorithm to repeatedly apply one or more different virtual loads to one or more virtual nodes in the test environment until a scaled-down load test model that mimics the system under a pre-defined real-world load is generated. Here, each of the one or more different virtual loads applied to each of the one or more virtual nodes is comparatively smaller relative to each of one or more corresponding real-world loads for each of one or more nodes defining the pre-defined real-world load.

Turning now to the drawings, FIG. 1 is a schematic block diagram illustrating one embodiment of a system 100 that can generate scaled-down load test models for testing real-world loads on, for example, systems and/or software services. At least in the illustrated embodiment, the system 100 includes, among other components, a network 102 connecting and/or coupling an orchestrator 104 and a system 106 (e.g., a system under test), which may include a software service) to one another so that the orchestrator 104 and the system 106 are in communication with each other.

The network 102 may include any suitable wired and/or wireless network that is known or developed in the future that enables the orchestrator 104 and the system 106 to be coupled to and/or in communication with one another and/or to share resources. In various embodiments, the network 102 may include the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating and/or sharing resources with one another that are possible and contemplated herein.

An orchestrator 104 may include any suitable electronic system, set of electronic devices, software, and/or set of applications capable of accessing, communicating with and/or sharing resources with the system 106 via the network 102. In various embodiments, the orchestrator 104 is configured to generate one or more scaled-down load test models that can test real-world loads on the system 106 and/or one or more software services hosted by and/or operating on the system 106.

Figure 2A:
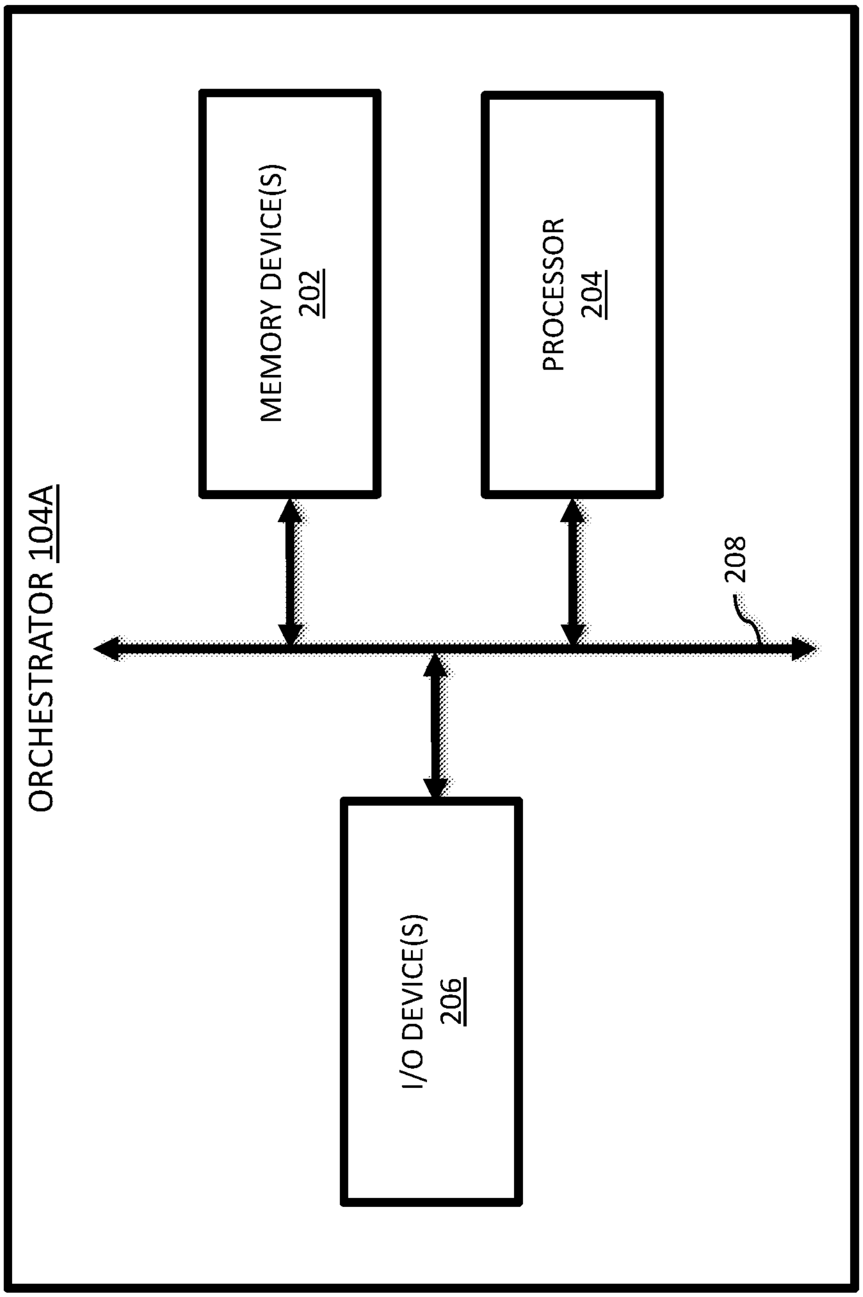
FIGS. 2A and 2B are schematic block diagrams illustrating various embodiments of an orchestrator included in the system of FIG. 1.

With reference to FIG. 2A, FIG. 2A is a block diagram of one embodiment of an orchestrator 104. At least in the illustrated embodiment, the orchestrator 104 includes, among other components, one or more memory devices 202, a processor 204, and one or more input/output (I/O) devices 206 coupled to and/or in communication with one another via a bus 208 (e.g., a wired and/or wireless bus).

A set of memory devices 202 may include any suitable quantity of memory devices 202. Further, a memory device 202 may include any suitable type of device and/or system that is known or developed in the future that can store computer-useable and/or computer-readable code. In various embodiments, a memory device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 204).

A memory device 202, in some embodiments, includes volatile computer-readable storage media. For example, a memory device 202 may include random-access memory (RAM), including dynamic RAM (DRAM), synchronous dynamic RAM (SDRAM), and/or static RAM (SRAM). In other embodiments, a memory device 202 may include non-volatile computer-readable storage media. For example, a memory device 202 may include a hard disk drive, a flash memory, and/or any other suitable non-volatile computer storage device that is known or developed in the future. In various embodiments, a memory device 202 includes both volatile and non-volatile computer-readable storage media.

Figure 3:
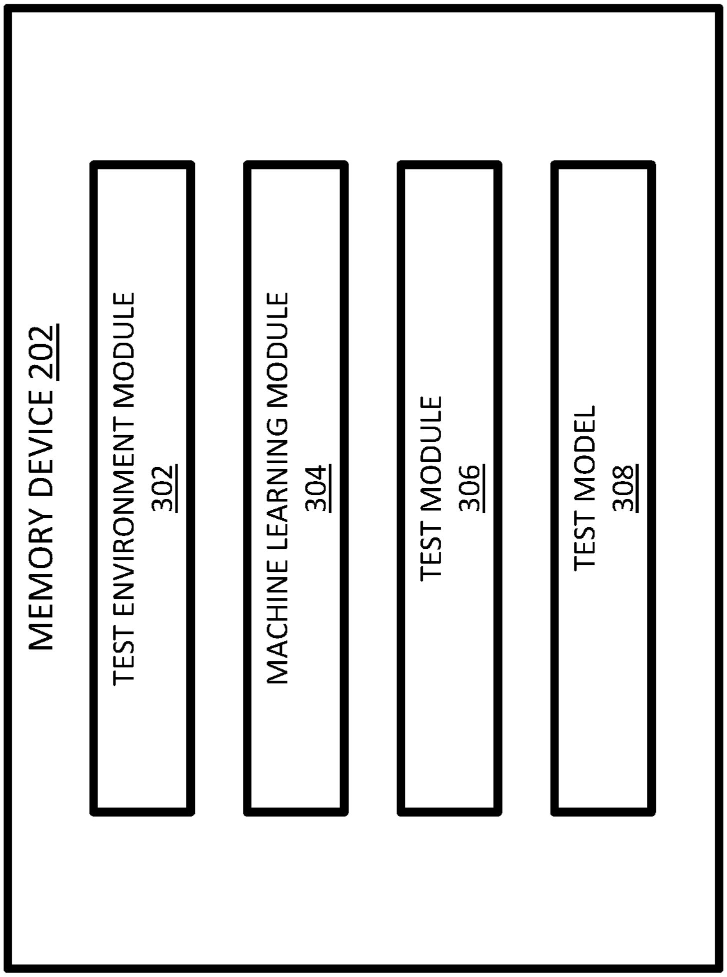
FIG. 3 is a schematic block diagram illustrating one embodiment of a memory device included in the orchestrators of FIGS. 2A and 2B.

With reference now to FIG. 3, FIG. 3 is a schematic block diagram of one embodiment of a memory device 202. At least in the illustrated embodiment, the memory device 202 includes, among other components, a test environment module 302, a machine learning module 304, and a test module 306 that are each configured to cooperatively operate/function with one another when executed by the processor 204 to generate one or more scaled-down load test models 308 that can test real-world loads on the system 106 and/or one or more software services hosted by and/or operating on the system 106.

A test environment module 302 may include any suitable hardware and/or software that can provide a test environment 900 (see, e.g., FIG. 9) for the system 106 and/or the software service(s) on the system 106. The test environment 900, in various embodiments, includes a virtual representation of the operation(s)/function(s) of the system 106.

In certain embodiments, the test environment 900 can include a virtual representation of the operation(s)/function(s) of one or more of the component nodes 602 of the system 106 (e.g., one or more apparatuses 604 (e.g., information handling device(s)), a network 606, and/or one or more servers 608, etc. (see, e.g., FIG. 6)), the software service(s) hosted on and/or provided by the system 106 (e.g., software nodes), one or more hardware nodes 700 (e.g., one or more memory device(s) 702, one or more processors 704, one or more I/O devices 706, and/or one or more buses 708, etc. (see, e.g., FIG. 7)) of one or more component nodes 602, one or more applications (e.g., application node(s)) of one or more of the component nodes 602 of the system 106, and/or one or more applications (e.g., application node(s)) of one or more hardware nodes 700 of one or more component nodes 602 of the system 106. In various embodiments, the test environment module 302 provides the test environment 900 by automatedly generating the test environment 900 and/or receiving the test environment 900 from a user (e.g., the user manually generates the test environment 900).

Figure 4:
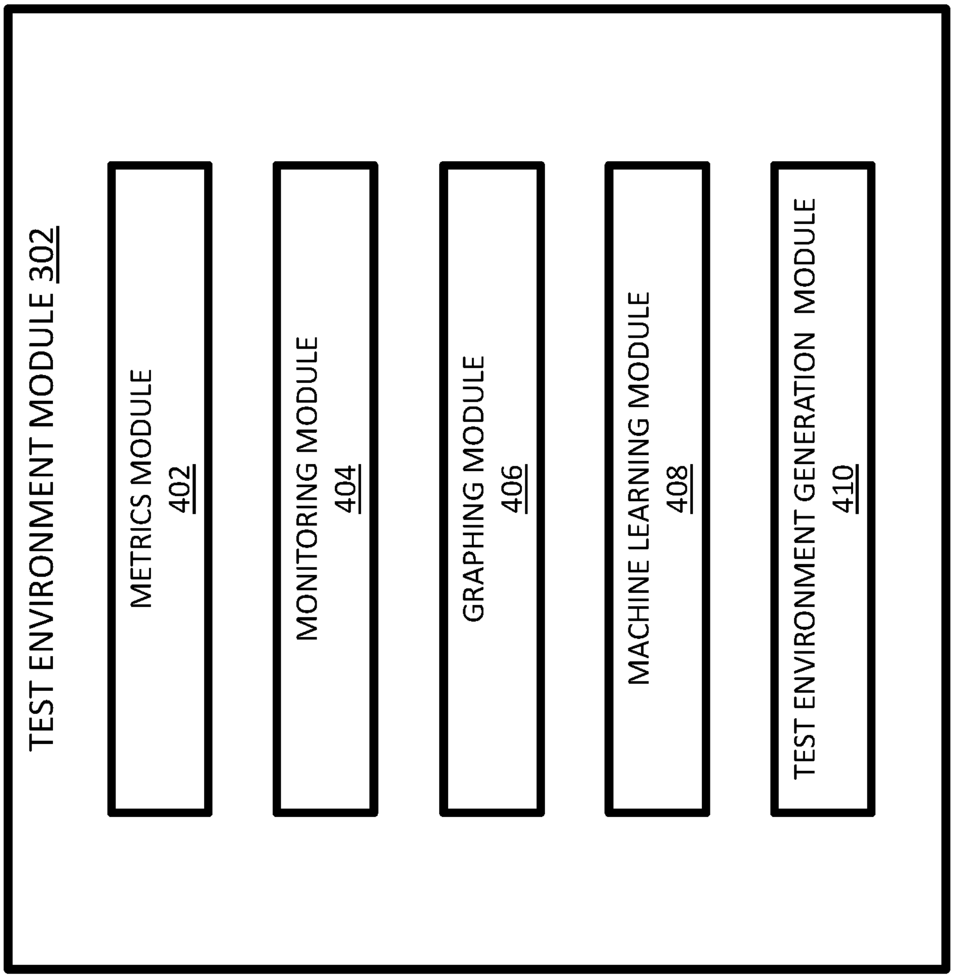
FIG. 4 is a schematic block diagram illustrating one embodiment of a test environment module included in the memory device of FIG. 3.

Referring to FIG. 4, FIG. 4 is a block diagram of one embodiment of a test environment module 302 that can automatedly generate a test environment 900. As least in the illustrated embodiment, the test environment module 302 includes, among other components, a metrics module 402, a monitoring module 404, a graphing module 406, a machine learning module 408, and a test environment generation module 410.

A metrics module 402 may include any suitable hardware and/or software that can identify measurable metrics in the system 106. In various embodiments, the metrics module 402 is configured to identify one or more metrics in the system 106 that can affect overall performance of the system 106 and/or one or more of the operation(s)/function(s) of the system 106. Further, the metrics module 402 is configured to determine how to measure each of the identified metrics.

In certain embodiments, the one or more metrics are related to the usage of the system 106 and/or based on the load(s) under which the system 106 operates, as further discussed elsewhere herein. In additional or alternative embodiments, the one or more metrics are related to the response(s) of the system 106 under such usage and/or under the load(s) placed on the system 106, as further discussed elsewhere herein.

In some embodiments, the one or more metrics are associated with and/or correspond to one or more of the component nodes 602 of the system 106 and/or the software service(s) hosted on and/or provided by the system 106 (e.g., software nodes). That is, the metrics module 402 can identify which component node(s) 602 and/or software node(s) have a measurable impact (e.g., the greatest impact, a large impact, a neutral impact, a low impact, etc.) on the performance of the system 106 based on the usage of the system 106, the load(s) under which the system 106 operates, the response of the system 106 under such usage, and/or the response of the system 106 with the load(s) placed on the system 106.

In additional or alternative embodiments, the one or more metrics are associated with and/or correspond to one or more hardware nodes 700 of one or more component nodes 602, one or more applications (e.g., application node(s)) of one or more of the component nodes 602, and/or one or more applications (e.g., application node(s)) of one or more hardware nodes 700. That is, the metrics module 402 can identify which hardware node(s) 700, application(s) of the component node(s) 602, and/or application(s) of the hardware node(s) 700 have a measurable impact (e.g., the greatest impact, a large impact, a medium impact, a neutral impact, a low impact, a small impact, a minimal impact, etc.) on the performance of the system 106 based on the usage of the system 106, the load(s) under which the system 106 operates, the response of the system 106 under such usage, and/or the response of the system 106 with the load(s) placed on the system 106.

The impact and/or importance of a metric can be based on any suitable technique and/or correlation that can identify a metric as having an impact on the performance of the system 106. The metrics module 402, in various embodiment, can identify one or more impactful and/or important metrics based on, for example, the type(s) and/or quantity of devices, the type(s) and/or quantity of software/applications, storage capacity, available storage, read/write speed, processing speed, I/O rate/speed, amount of power, bandwidth, etc., among other metrics that are possible and contemplated herein.

Notably, because different systems 106 can include nodes and/or provide different software services, it is recommended that the proper metrics be identified in an effort to generate the proper test model for a particular system 106 and/or software service. For example, in a database, data size, index usage, and processor usage have a significant impact on the performance of the database. Similarly, in a clustered service, the quantity of clustered nodes or connections to external entities can impact the performance of the clustered service.

In some embodiments, the metric module 402 may determine how to measure the one or more metrics using any suitable technique and/or correlation that can quantify a particular metric. For example, the speed of a processor 704 can be used as a metric (e.g., application metadata can be utilized to measure the quantity of requests per minute the processor 704 is performing, processor utilization, the quantity of users using the service(s) of the system 106, and/or network throughput, etc.), the metadata of a memory device 702 can be used to determine a database size, memory utilization, and/or memory allocation for a memory device 702, etc., among other examples that are possible and contemplated herein.

The metrics module 402, in various embodiments, can group the component node(s) 602, the software node(s), the hardware node(s) 700, application(s) of the component node(s) 602, and/or application(s) of the hardware node(s) 700 that are identified as having a measurable impact on the performance of the system 106. The grouping can be based on a suitable factor including, for example, the system type and/or purpose/application of the system 106, the type(s) and/or quantity of component node(s) 602 in the system 106, the type and/or quantity of software node(s) in the component node(s) 602, the type(s) and/or quantity of hardware nodes 602 in one or more of the component nodes 106, the type(s) and/or quantity of applications in one or more of the component nodes 602, and/or the type(s) and/or quantity of applications in one or more of the hardware nodes 700, among other factors that are possible and contemplated herein.

In some embodiments, the component node(s) 602, software node(s), hardware node(s) 700, application(s) of the component node(s) 602, and/or application(s) of the hardware node(s) 700 that are identified as having the greatest impact on the performance of the system 106 are grouped together by the metrics module 402. In other embodiments, the metrics module 402 groups together all of the component node(s) 602, the software node(s), the hardware node(s) 700, application(s) of the component node(s) 602, and/or application(s) of the hardware node(s) 700 that are identified as having any measurable impact on the performance of the system 106. In still other embodiments, the metrics module 402 groups together all of the component node(s) 602, the software node(s), the hardware node(s) 700, application(s) of the component node(s) 602, and/or application(s) of the hardware node(s) 700 that are identified as having a measurable impact on the performance of the system 106 greater than a threshold impact, which can be any suitable threshold impact (e.g., greater than or equal to a large impact, greater than or equal to a medium impact, greater than or equal to neutral impact, greater than or equal to a low/small/minimal impact, etc.).

The metrics module 402 can then transmit the group of component node(s) 602, software node(s), hardware node(s) 700, application(s) of the component node(s) 602, and/or application(s) of the hardware node(s) 700 that have an identified impact on the performance of the system 106 to the monitoring module 404 and/or to the machine learning module 406. In addition, various embodiments of the monitoring module 404 and/or the machine learning module 406 are configured to receive the transmitted group of component node(s) 602, software node(s), hardware node(s) 700, application(s) of the component node(s) 602, and/or application(s) of the hardware node(s) 700 that have an identified impact on the performance of the system 106 from the metrics module 402.

A monitoring module 404 may include any suitable hardware and/or software that can monitor, over time, the transmitted group of component node(s) 602, software node(s), hardware node(s) 700, application(s) of the component node(s) 602, and/or application(s) of the hardware node(s) 700 that have an identified impact on the performance of the system 106 from the metrics module 402. In various embodiments, the monitoring module 404 is configured to take one or more snapshots of the group of component node(s) 602, software node(s), hardware node(s) 700, application(s) of the component node(s) 602, and/or application(s) of the hardware node(s) 700 that have an identified impact on the performance of the system 106 during various usage operations to gather data about the performance of the system 106 during various usage operations including different loads.

In certain embodiments, the snapshot(s) of the system 106 include data about the transmitted group of component node(s) 602, software node(s), hardware node(s) 700, application(s) of the component node(s) 602, and/or application(s) of the hardware node(s) 700 that have an identified impact on the performance of the system 106 from the metrics module 402 under one or more different loads applied to the system 106 during its various usage operations. For example, one or more snapshots can be taken during one or more low load operations, one or more medium load operations, one or more "normal" load operations, and/or one or more high load operations, etc., among other sized loads that are possible and contemplated herein, to gather data about the performance of the system 106 during the low load operation(s), medium load operation(s), normal load operation(s), and/or high load operation(s), etc.

In additional or alternative embodiments, the snapshot(s) of the system 106 include data representing the response of the system 106 under its various usage operations and/or under the different loads applied the system 106. For example, one or more snapshots can be taken of one or more responses of the system 106 during the low load operation(s), medium load operation(s), normal load operation(s), and/or high load operation(s), etc. to gather data about the responsiveness of the system 106 during the low load operation(s), medium load operation(s), normal load operation(s), and/or high load operation(s), etc.

The monitoring module 404, in some embodiments, can store the snapshot(s) of the system 106. Further, the monitoring module 404 can transmit the snapshot(s) of the system 106 to the graphing module 406 for processing by the graphing module 406. In addition, various embodiments of the graphing module 406 are configured to receive the snapshot(s) of the system 106 from the monitoring module 404.

The graphing module 406 may include any suitable hardware and/or software that can generate one or more graphs of the system 106 under various loads. The data in the various graphs represent the performance of the system 106 under different conditions and/or loads.

Figure 8:
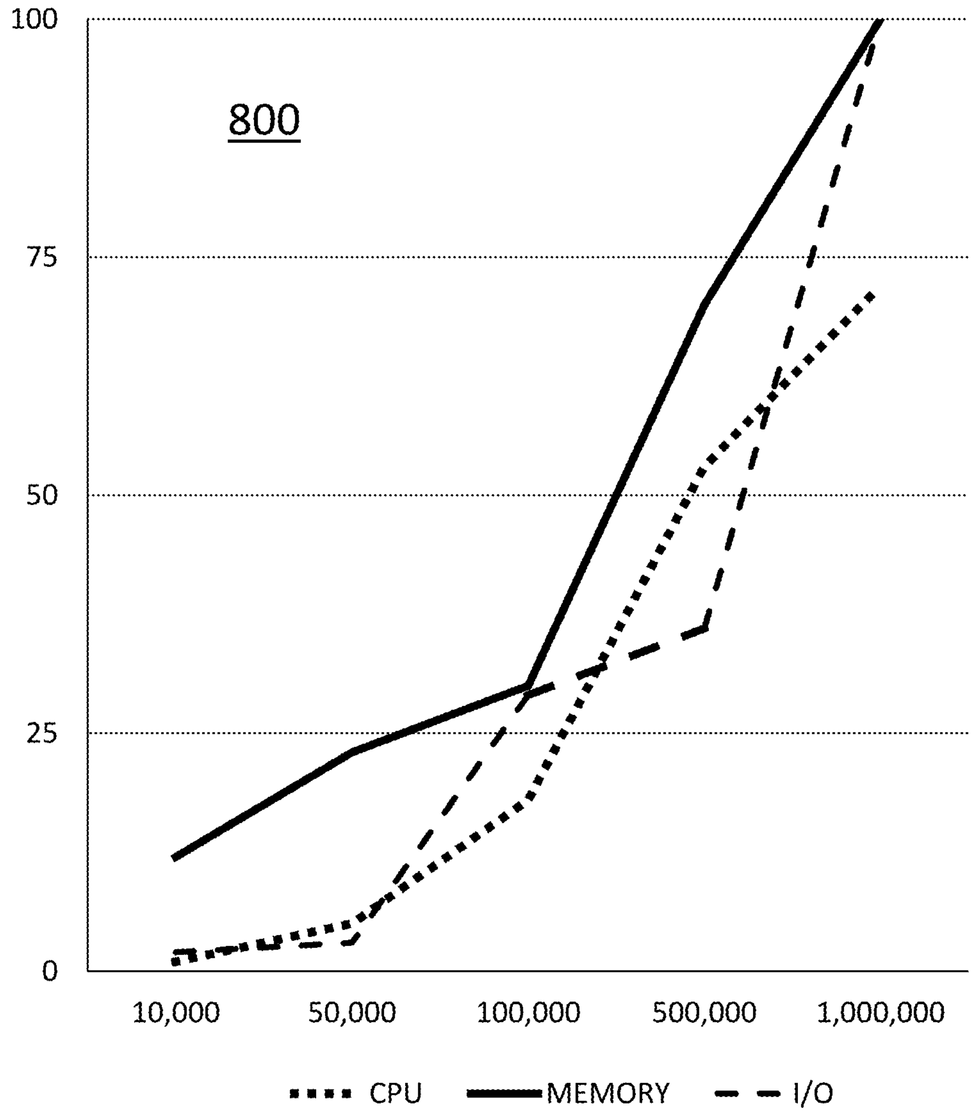
FIG. 8 is a diagram illustrating one embodiment of data and a graph showing the real-world performance of the system under test in FIG. 6.

With reference to FIG. 8, FIG. 8 illustrates one example of a graph 800 representing one example of data generated from observed and/or determined performance of the system 106 under different load conditions. Notably, the example illustrated in FIG. 8 is for use in understanding the concepts of the various embodiments and is not intended to limit the scope and/or spirit of the various embodiments in any way.

As shown in the chart and graph 800 of FIG. 8, the performance of a central processing unit (CPU) (e.g., a processor 704), a memory device (e.g., a memory device 702), and the I/O throughput of the system 106 are shown under different loads conditions. The illustrated example shows the performance of the system 106 and/or various nodes within the system 106 operating under 10,000 concurrent requests, 50,000 concurrent requests, 100,000 concurrent requests, 500,000 concurrent requests, and 1,000,000 concurrent requests on the system 106.

In this system 106, the CPU operates at 1% capacity with 10,000 concurrent requests, at 5% capacity with 50,000 concurrent requests, at 18% capacity with 100,000 concurrent requests, at 53% with 500,000 concurrent requests, and at 72% capacity with 1,000,000 concurrent requests. Further, the memory device operates at 12% capacity with 10,000 concurrent requests, at 23% capacity with 50,000 concurrent requests, at 30% capacity with 100,000 concurrent requests, at 70% with 500,000 concurrent requests, and at 100% capacity with 1,000,000 concurrent requests. Similarly, the I/O throughput of the system 106 is 2% capacity with 10,000 concurrent requests, 3% capacity with 50,000 concurrent requests, 29% capacity with 100,000 concurrent requests, 36% with 500,000 concurrent requests, and 100% capacity with 1,000,000 concurrent requests. Here, the data shows that, among other things, the slope of the memory device and the I/O throughput increases exponentially between 500,000 and 1,000,000 concurrent requests.

To test system 106 under these load conditions could be costly from an economic and/or time perspective. As such, the various embodiments disclosed herein allow the system 106 to be load tested using a scaled-down load test model that mimics the system 106 operating under higher loads, which can reduce one or more costs.

Returning to FIG. 4, the graphing module 406 transmits the graph 800 and/or the data used to generate the graph 800 to the machine learning module 408 for processing on the machine learning module 408. In addition, the machine learning module 408 is configured to receive the graph 800 and/or the data used to generate the graph 800 from the graphing module 406.

A machine learning module 408 may include any suitable hardware and/or software that can utilize the graph 800 and/or the data used to generate the graph 800 to analyze the performance of the system 106. In various embodiments, the machine learning module 408 is configured to analyze the graph 800 and/or the data used to generate the graph 800 to identify to determine the correlation(s) between various inputs/outputs of the system 106.

In various embodiments, a machine learning algorithm is used to identify and/or determine the correlation(s) between various inputs/outputs of the system 106. The machine learning algorithm may be any type of machine learning technique and/or algorithm that is known or developed in the future that can identify and/or determine a correlation between various inputs/outputs of the system 106.

In certain embodiments, the machine learning algorithm is configured to look for patterns in the system 106 in which undesirable performance, situations, and/or results occur (e.g., latency, congestion, decreased speed, inefficiencies, stalls, etc.). That is, the machine learning algorithm is capable of identifying and/or finding undesirable performance, situations, and/or results in one or more component nodes 602, one or more software services hosted on and/or provided by the system 106 (e.g., software nodes), one or more hardware nodes 700 of one or more component nodes 602, one or more applications (e.g., application node(s)) of one or more of the component nodes 602 of the system 106, and/or one or more applications (e.g., application node(s)) of one or more hardware nodes 700 of one or more component nodes 602 of the system 106 under certain load conditions.

Over time and via repeated iterations, the machine learning algorithm can correlate trends in the identified metrics and the corresponding component node(s) 602, software node(s), hardware node(s) 700, application node(s)) of one or more of the component node(s) 602 of the system 106, and/or application node(s) of the hardware node(s) 700 based on usage of the system 106 and/or the response of the system 106 to various load conditions. For example, the machine learning algorithm may observe that the system 106 utilizes approximately half of its resources under certain load conditions, which can define efficient operations. However, as the load on the system 106 increases, individual resources (e.g., nodes) of the system 106 can be consumed linearly or exponentially until the system 106 is no longer operating efficiently under a particular load. Accordingly, which resource(s) (e.g., node(s)) is/are affected by an increase in load and/or how the resource(s) are affected by an increased load can be observed and correlated by the machine learning algorithm.

The machine learning algorithm, in various embodiments, is configured to generate a "best guess" map (e.g., an initial scaled-down load) of the system 106 that includes a predetermined percentage (e.g., x %) of a high load for one or more metrics corresponding to one or more virtual nodes of the system 106. The best guess map is based on the correlation(s) and/or pattern(s) of the various inputs/outputs of the system 106 and the virtual node(s) that is/are responsible for the identified undesirable performance, situations, and/or results in the system 106.

The machine learning module 408 is configured to transmit the best guess map to the test environment generation module 410 for processing by the test environment generation module 410. In addition, the test environment generation module 410 is configured to receive the best guess map from the machine learning module 408.

A test environment module 410 may include any suitable hardware and/or software that can generate a test environment 900 for the system 106. In various embodiments, the test environment 900 is generated based on the best guess map received from the machine learning module 408.

Figure 9:
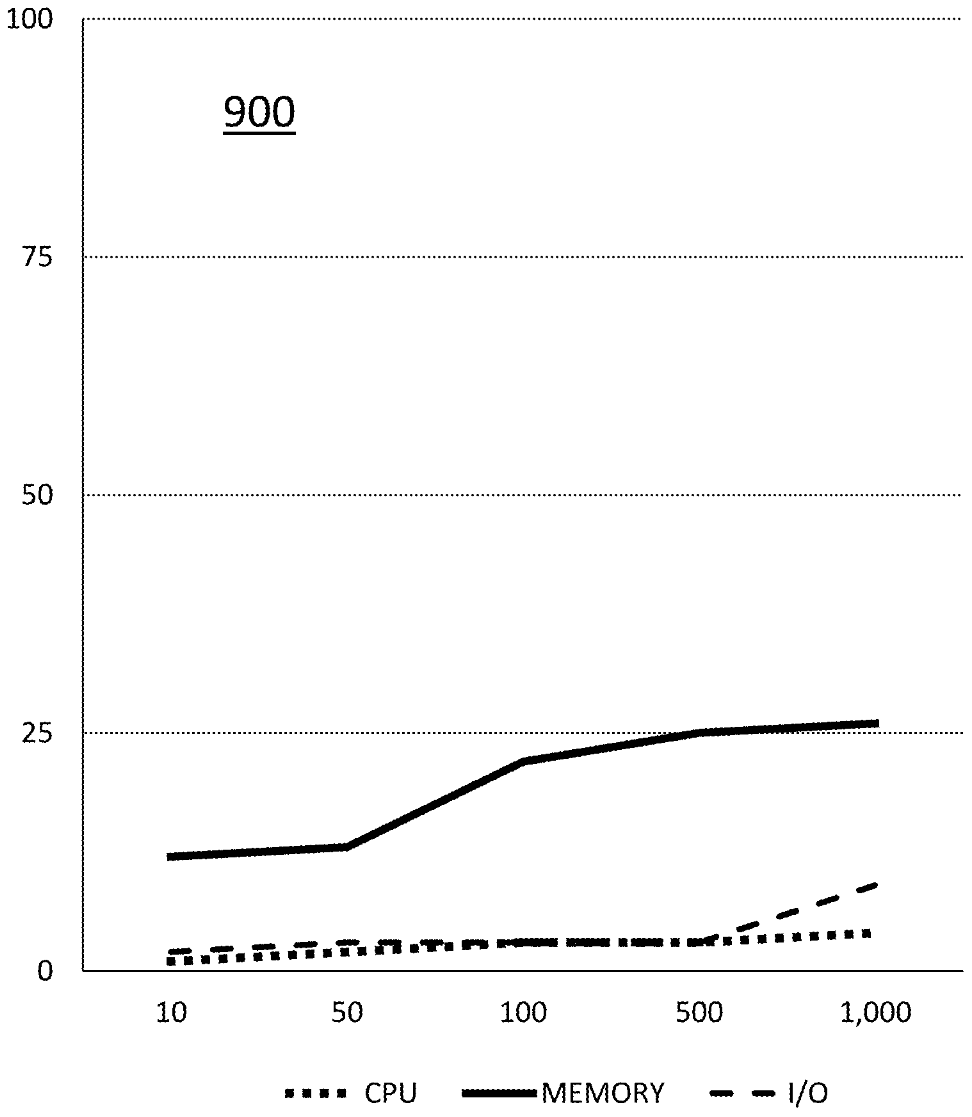
FIG. 9 is a diagram illustrating one embodiment of a test environment for the system under test in FIG. 6.

With reference to FIG. 9, FIG. 9 is one non-limiting example of an embodiment of a test environment 900 for the system 106 that corresponds with the real-world performance of the system 106 shown in the graph 800. Again, the real-world performance of the system 106 shown in the graph 800 includes the metric(s) for the identified important nodes (e.g., CPU operational capacity, memory device operational capacity, and I/O throughput) for the system 106. The test environment 900 can be a virtual representation of an initial state and/or starting point for the system 106 that can be modified to eventually generate a scaled-down test model 308 (see, e.g., FIG. 3) for testing the system 106, as discussed elsewhere herein.

The virtual representation of the system 106, in various embodiments, includes virtual representations of the node(s) that is/are identified as having impact on the performance of the system 106. That is, the virtual representation of the system 106 includes virtual representations of the component node(s) 602 (e.g., virtual component node(s)), software node(s) (e.g., virtual software node(s)), hardware node(s) 700 (e.g., virtual hardware node(s)), application(s) of the component node(s) 602 (e.g., virtual application node(s)), and/or application(s) of the hardware node(s) 700 (e.g., virtual application node(s)).

In FIG. 9, the virtual initial state of the system 106 includes a CPU (e.g., a virtual component node) operating at 1% capacity with 10 concurrent requests, at 2% capacity with 50 concurrent requests, at 3% capacity with 100 concurrent requests, at 3% with 500 concurrent requests, and at 4% capacity with 1,000 concurrent requests. Further, a virtual memory device (e.g., a virtual component node) operates at 12% capacity with 10 concurrent requests, at 13% capacity with 50 concurrent requests, at 22% capacity with 100 concurrent requests, at 25% with 500 concurrent requests, and at 26% capacity with 1,000 concurrent requests. Similarly, the I/O throughput of the system 106 (e.g., a system response at a virtual component node) is 2% capacity with 10 concurrent requests, 3% capacity with 50 concurrent requests, 3% capacity with 100 concurrent requests, 3% with 500 concurrent requests, and 9% capacity with 1,000 concurrent requests.

A comparison of the test environment 900 and the real-world performance of the system 106 shown in the graph 800, indicates that the test environment 900 does not match the real-world performance the system 106 operating at various higher loads shown in the graph 800. Accordingly, the metrics in the test environment 900 should be adjusted so that a scaled-down test model 308 that mimics and/or is better aligned to the real-world performance of the system 100 at the various higher loads is generated.

Referring back to FIG. 4, various embodiments of the test environment module 410 are configured to transmit the test environment 900 to the machine learning module 304 (see, FIG. 3) for processing on the machine learning module 304. In addition, the machine learning module 304 is configured to receive the test environment 900 from the test environment module 410. In additional or alternative embodiments in which a user manually generates a test environment 900, the machine learning module 304 is configured to receive the manually generated test environment 900 from the user.

The machine learning module 304 may include any suitable hardware and/or software that can generate one or more recommendations for modifying and/or constraining a test environment 900. In various embodiments, the recommendation(s) is/are generated based on the test environment 900 (e.g., the initial state and/or starting point for the system 106).

The machine learning module 304, in various embodiments, is configured to utilize a machine learning algorithm to generate the recommendation(s) based on constraining and/or manipulating one or more metrics corresponding to one or more virtual nodes in the test environment 900 for the system 106. By constraining and/or manipulating the metric(s) corresponding to the virtual node(s) in the test environment 900, one or more updated test environments can be generated, as discussed elsewhere herein (see, e.g., updated test environment 1000A in FIG. 10A, updated test environment 1000B in FIG. 10B, and updated test environment 1000C in FIG. 10C, which are also simply referred to herein, individually and/or collectively, as updated test environment 1000).

The machine learning algorithm may include any suitable machine learning technique and/or algorithm that is known or developed in the future capable of changing one or more parameters associated with a metric for a virtual node to modify the metric so that the virtual node corresponding to the modified metric performs differently and/or causes the test environment 900 to more closely mimic the real-world performance of the system 106. In various embodiments, the machine learning algorithm is configured to perform an iterative process on the test environment 900 to repeatedly modify one or more parameters of one or more metrics associated with a virtual node (e.g., virtual component node(s), virtual software node(s), virtual hardware node(s), and/or virtual application node(s)). Further, the machine learning algorithm tracks the inputs and outputs of the test environment 900 resulting from the modified metrics and/or loads to determine which metrics are affected by a particular load on the virtual representation of the system 106.

In addition, various embodiments of the machine learning algorithm are configured to provide recommendations for constraining and/or modifying the parameter(s) of the metric(s) associated with one or more virtual nodes so that the test environment 900 mimics the real-world performance of the system 106 under various loads. The recommendation can be provided to a user that can manually modify the test environment 900 and/or to the test module 306 for automated modification of a test environment 900.

In operation, the machine learning algorithm recommends constraining and/or modifying the best guess map (e.g., the initial state of x %) in the test environment 900 and measuring the results. That is, the machine learning algorithm recommends one or more additional x % sized loads be applied to the metric(s) in the test environment 900, which can be used by the test module 306 to generate an updated test environment 1000, as discussed elsewhere herein.

A recommendation may include, for example, degrading performance of a processor 704 (e.g., a CPU) by 50%, among other amounts that are possible and contemplated herein. Another non-limiting example of a recommendation may include growing the number of database records and/or indices by a given amount and/or level relative to the available memory in a memory device 702. While these are specific example recommendations, the configuration and/or software service(s) of different systems will generate different recommendations. As such, the above examples are for illustration purposes and are not intended to limit the various embodiments disclosed herein in any manner.

In response to the output of an updated test environment 1000 not matching the real-world performance of the system 106, the machine learning module 304 is configured to use the machine learning algorithm to perform further iterations of the machine learning algorithm until an updated test environment 1000 matches and/or substantially matches the real-world performance of the system 106 shown on the graph 800. In this manner, each iteration of the machine learning algorithm can modify the parameter(s) on the metric(s) so that the test environment 900 is further constrained in an effort to move closer and closer to the real-world performance of the system 106 (e.g., the shape in an updated test environment 1000 matches or substantially matches the shape in the graph 800).

As discussed above, the machine learning module 304 is configured to transmit the recommendation(s) for modifying the parameter(s) of the metric(s) to the test module 306 for processing by the test module 306. In addition, the test module 306 is configured to receive the recommendation(s) from the machine learning module 304.

A test module 306 may include any suitable hardware and/or software that can generate an updated test environment 1000. In various embodiments, each updated test environment 1000 is generated based on the recommendation(s) received from the machine learning module 304 as a result of a particular iteration of the machine learning algorithm.

The test module 306, in some embodiments, is configured to compare each updated test environment 1000 and the real-world performance of the system 106 in the graph 800 to determine if they match and/or substantially match. In response to an updated test environment 1000 and the real-world performance of the system 106 in the graph 800 not matching (e.g., a non-match), the test module 306 is configured to notify the machine learning module 304 of such and asks the machine learning module 304 to perform another iteration of the machine learning algorithm.

In response to an updated test environment 1000 and the real-world performance of the system 106 in the graph 800 matching, the test module 306 is configured to generate a test model 306 based on the matching updated test environment 1000. In further embodiments, the test module 306 is configured to utilize the generated test model 306 to test the system 106 in the real world.

Figure 10A:
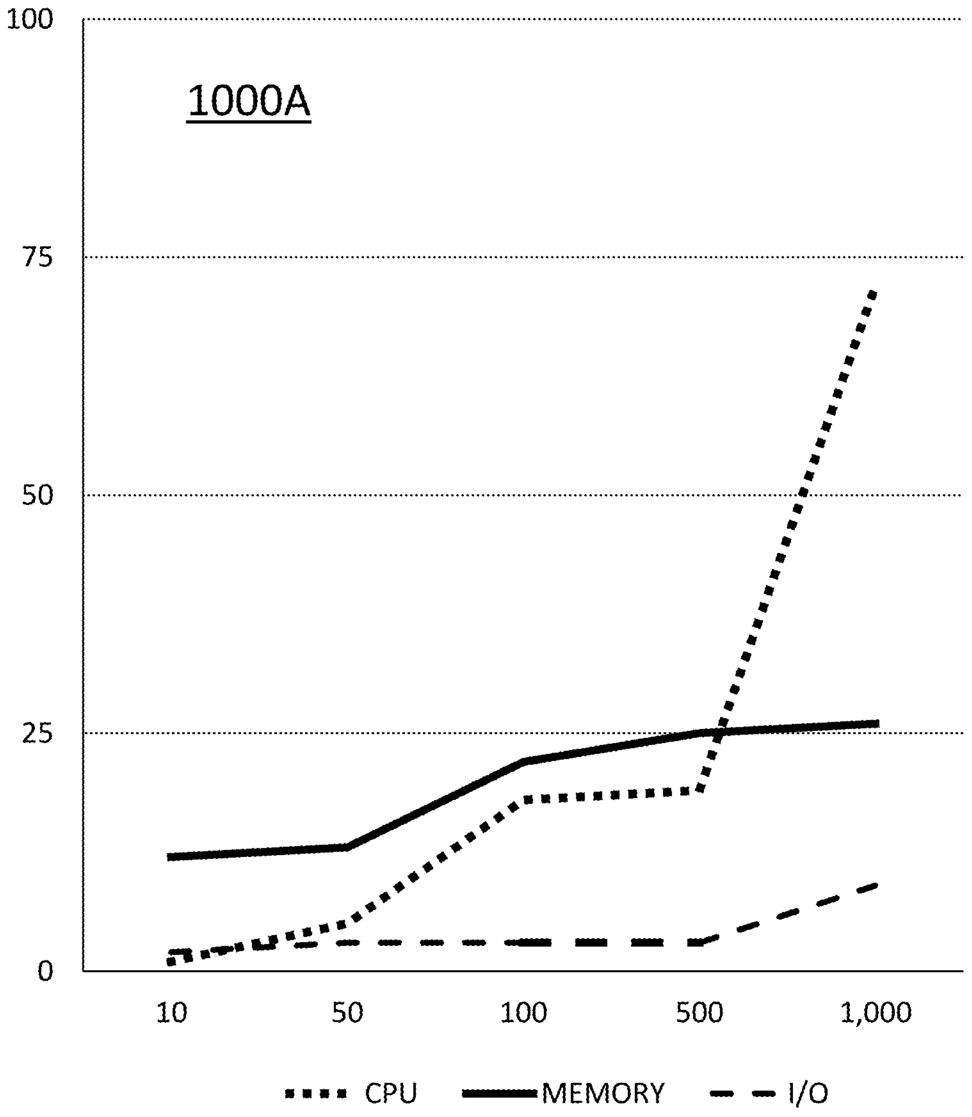
FIGS. 10A though 10C are diagram illustrating example iterations of an updated test environment for the system under test in FIG. 6.
Figure 10B:
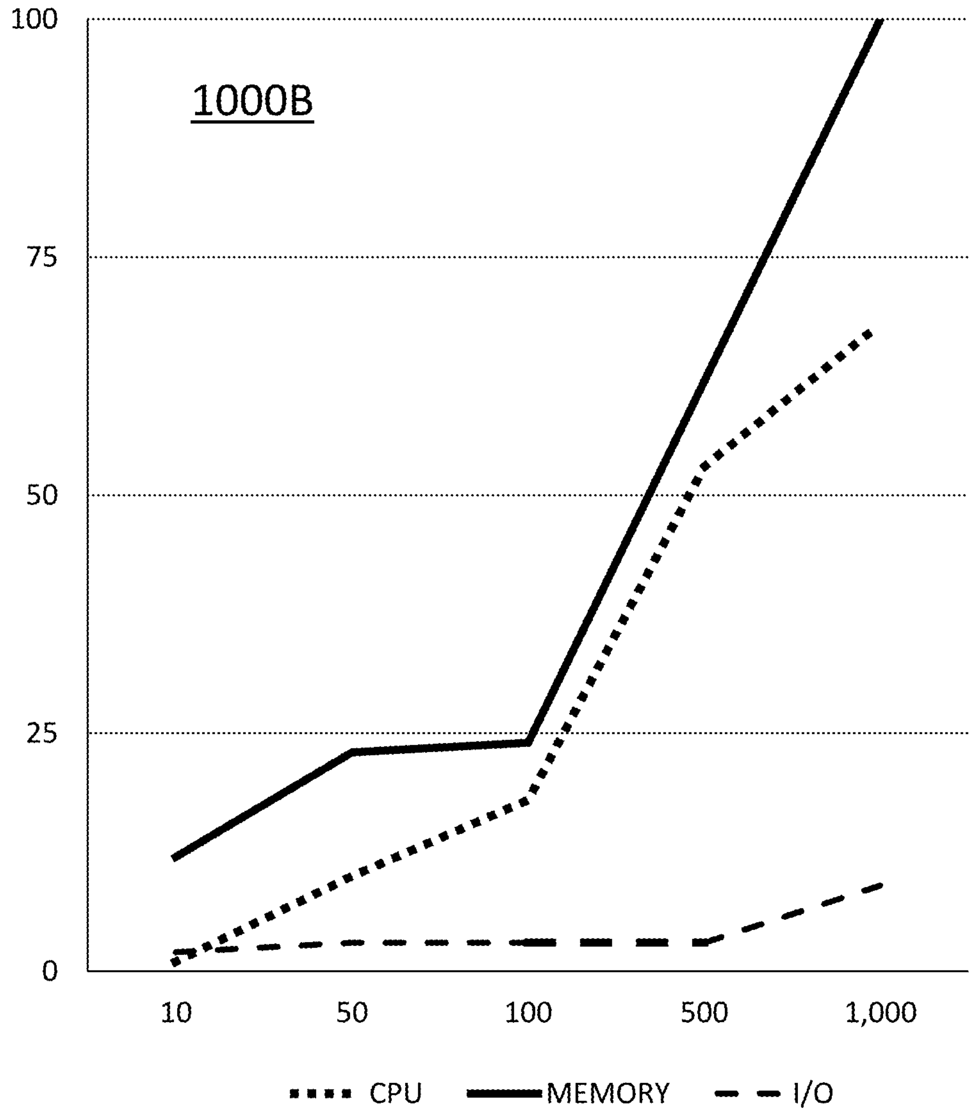
Figure 10C:
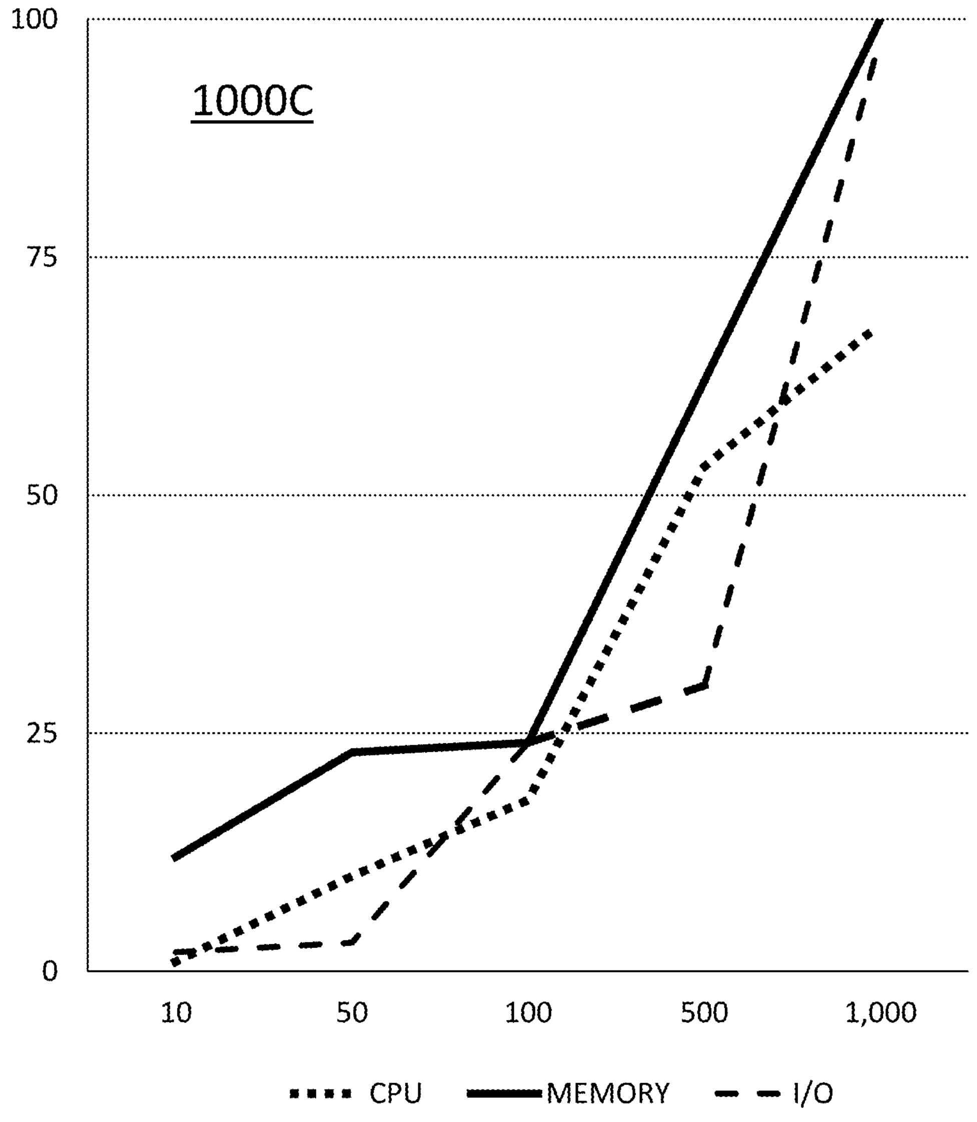

With reference to FIGS. 10A through 10C, FIGS. 10A through 10C show non-limiting examples of updated test environments 1000A, 1000B, and 1000C generated by the test module 306 in response to the recommendation(s) received from the machine learning module 304 as a result of three different iterations of the machine learning algorithm. Notably, the examples illustrated in FIGS. 10A through 10C are for better understanding the principles of the various embodiments disclosed herein and are not intended to limit the spirit and scope of the various embodiments in any way.

In FIG. 10A, an updated test environment 1000A includes a virtual CPU (e.g., of a virtual component node 602) operating at 1% capacity with 10 concurrent requests, at 5% capacity with 50 concurrent requests, at 18% capacity with 100 concurrent requests, at 19% with 500 concurrent requests, and at 72% capacity with 1,000 concurrent requests. Further, a virtual memory device (e.g., of a virtual component node 602) operates at 12% capacity with 10 concurrent requests, at 13% capacity with 50 concurrent requests, at 22% capacity with 100 concurrent requests, at 25% with 500 concurrent requests, and at 26% capacity with 1,000 concurrent requests. Similarly, the I/O throughput of the system 106 (e.g., a system response at a virtual component node 602) is 2% capacity with 10 concurrent requests, 3% capacity with 50 concurrent requests, 3% capacity with 100 concurrent requests, 3% with 500 concurrent requests, and 9% capacity with 1,000 concurrent requests.

Here, the updated test environment 1000A shows that the virtual CPU has been properly constrained because the data and the graph in the updated test environment 1000A match the real-world performance of the processor 702 shown in the data and the graph 800 in FIG. 8. However, the virtual memory device and the virtual I/O throughput in the updated test environment 1000A do not match the real-world performance of the memory device 704 and the real-world I/O throughput of the system 106 shown in the data and the graph 800 in FIG. 8.

In response to the updated test environment 1000A not matching the real-world performance of the system 106, the test module 306 will notify the machine learning module 304 of the results in the updated test environment 1000A and the machine learning module 304 will perform another iteration of the machine learning algorithm based on this information. Further, the machine learning module 304 will provide a subsequent set of recommendations to the test module 306 after performing the next iteration of the machine learning algorithm, which may include the same and/or different constraints on the virtual CPU and different constraints on the virtual memory device and/or virtual I/O throughput.

In FIG. 10B, an updated test environment 1000B includes the virtual CPU (e.g., of a virtual component node 602) operating at 1% capacity with 10 concurrent requests, at 10% capacity with 50 concurrent requests, at 18% capacity with 100 concurrent requests, at 53% with 500 concurrent requests, and at 68% capacity with 1,000 concurrent requests. Further, the virtual memory device operates at 12% capacity with 10 concurrent requests, at 23% capacity with 50 concurrent requests, at 24% capacity with 100 concurrent requests, at 62% with 500 concurrent requests, and at 100% capacity with 1,000 concurrent requests. Similarly, the I/O throughput of the system 106 is 2% capacity with 10 concurrent requests, 3% capacity with 50 concurrent requests, 3% capacity with 100 concurrent requests, 3% with 500 concurrent requests, and 9% capacity with 1,000 concurrent requests.

Here, the updated test environment 1000B shows that the virtual CPU has been constrained close to real-world performance of the processor 702 because the data and the graph in the updated test environment 1000B substantially matches the real-world performance of the processor 702 shown in the data and the graph 800 in FIG. 8. Further, the virtual memory device been properly constrained because the data and the graph in the updated test environment 1000B matches the real-world performance of the memory device 702 shown in the data and the graph 800 in FIG. 8. However, the virtual I/O throughput in the updated test environment 1000B does not match the real-world I/O throughput of the system 106 shown in the data and the graph 800 in FIG. 8.

In response to the updated test environment 1000B not matching the real-world performance of the system 106, the test module 306 will notify the machine learning module 304 of the results in the updated test environment 1000B and the machine learning module 304 will perform another iteration of the machine learning algorithm based on this information. Further, the machine learning module 304 will provide a subsequent set of recommendations to the test module 306 after performing the next iteration of the machine learning algorithm, which may include the same and/or different constraints on the virtual CPU and different constraints on the virtual memory device and/or virtual I/O throughput.

In FIG. 10C, an updated test environment 1000C includes the virtual CPU (e.g., of a virtual component node 602) operating at 1% capacity with 10 concurrent requests, at 10% capacity with 50 concurrent requests, at 18% capacity with 100 concurrent requests, at 53% with 500 concurrent requests, and at 68% capacity with 1,000 concurrent requests. Further, the virtual memory device operates at 12% capacity with 10 concurrent requests, at 23% capacity with 50 concurrent requests, at 24% capacity with 100 concurrent requests, at 62% with 500 concurrent requests, and at 100% capacity with 1,000 concurrent requests. Similarly, the I/O throughput of the system 106 is 2% capacity with 10 concurrent requests, 3% capacity with 50 concurrent requests, 24% capacity with 100 concurrent requests, 30% with 500 concurrent requests, and 98% capacity with 1,000 concurrent requests.

Here, the updated test environment 1000C shows that the virtual CPU has been constrained close to real-world performance of the processor 702 because the data and the graph in the updated test environment 1000C substantially matches the real-world performance of the processor 702 shown in the data and the graph 800 in FIG. 8. Further, the virtual memory device been properly constrained because the data and the graph in the updated test environment 1000C matches the real-world performance of the memory device 702 shown in the data and the graph 800 in FIG. 8. Moreover, the virtual I/O throughput in the updated test environment 1000C has been constrained close to real-world performance of the system 106 because the data and the graph in the updated test environment 1000C substantially matches the real-world performance of the system 106 shown in the data and the graph 800 in FIG. 8.

In embodiments in which a substantial match is not sufficient for generating a test model 308, the updated test environment 1000C not matching the real-world performance of the system 106, the test module 306 and the machine learning module 304 will continue to perform iterations until an updated test environment 1000 matches the real-world performance of the system 106. In embodiments in which a substantial match is sufficient for generating a test model 308, the test module 306 will generate a test model 308 based on the updated test environment 1000C and may use the test model 308 to test the real-world system 106.

A substantial match may include any suitable correlation and/or factors that can define a near match of an updated test environment 1000 and the real-world performance of the system 106. The substantial match can be based on any mathematical formula and/or theory including, for example, a calculus-based formula, gap analysis between data points, etc., among other formulas and/or theories that are possible and contemplated herein.

Referring back to FIG. 2A, a processor 204 may include any suitable non-volatile/persistent hardware and/or software configured to perform and/or facilitate performing functions and/or operations for generating scaled-down load test models 308 for testing real-world loads. In various embodiments, the processor 204 includes hardware and/or software for executing instructions in one or more modules and/or applications that can perform and/or facilitate performing functions and/or operations for generating scaled-down load test models 308 for testing real-world loads. The modules and/or applications executed by the processor 204 for generating scaled-down load test models for testing real-world loads can be stored on and executed from one or more memory devices 202 and/or from the processor 204.

Figure 5:
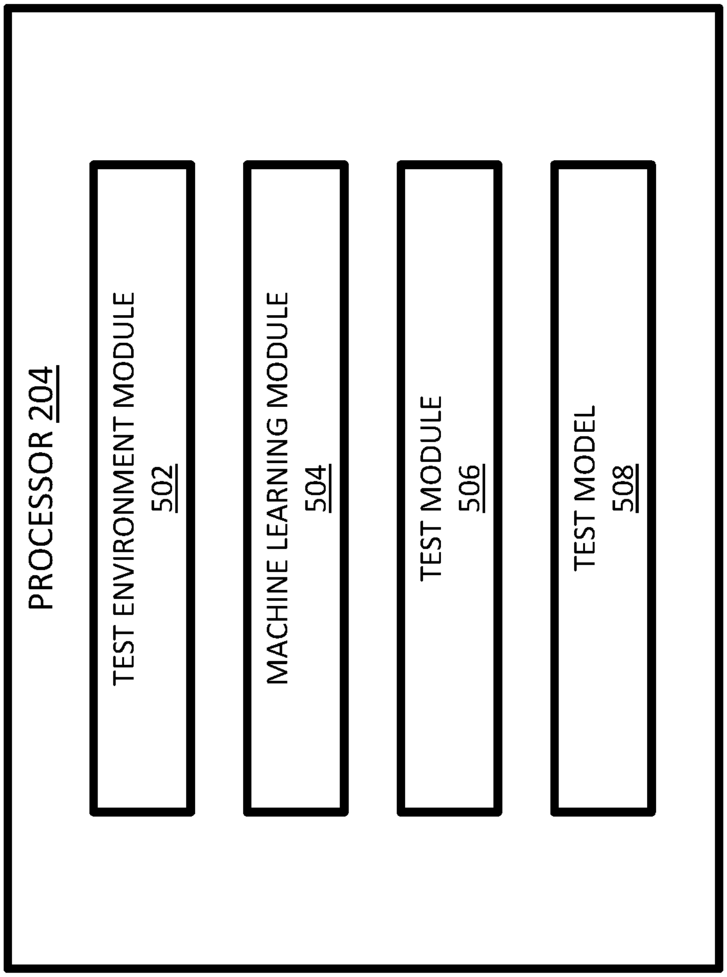
FIG. 5 is a schematic block diagram illustrating one embodiment of a processor included in the orchestrators of FIGS. 2A and 2B.

With reference to FIG. 5, FIG. 5 is a schematic block diagram of one embodiment of a processor 204. At least in the illustrated embodiment, the processor 204 includes, among other components, a test environment module 502, a machine learning module 504, and a test module 506 that are each configured to cooperatively operate/function with one another when executed by the processor 204 to generate one or more scaled-down load test models 508 that can test real-world loads on the system 106 and/or one or more software services hosted by and/or operating on the system 106 similar to the test environment module 302, machine learning module 304, test module 306, and scaled-down load test models 308 discussed with reference to FIG. 3.

With reference again to FIG. 2A, an I/O device 206 may include any suitable I/O device that is known or developed in the future. In various embodiments, the I/O device 206 is configured to enable the orchestrator 104A to communicate with the system 106 so that the orchestrator can exchange data (e.g., transmit and receive data) with the system 106 when the system 106 is under test.

Figure 2B:
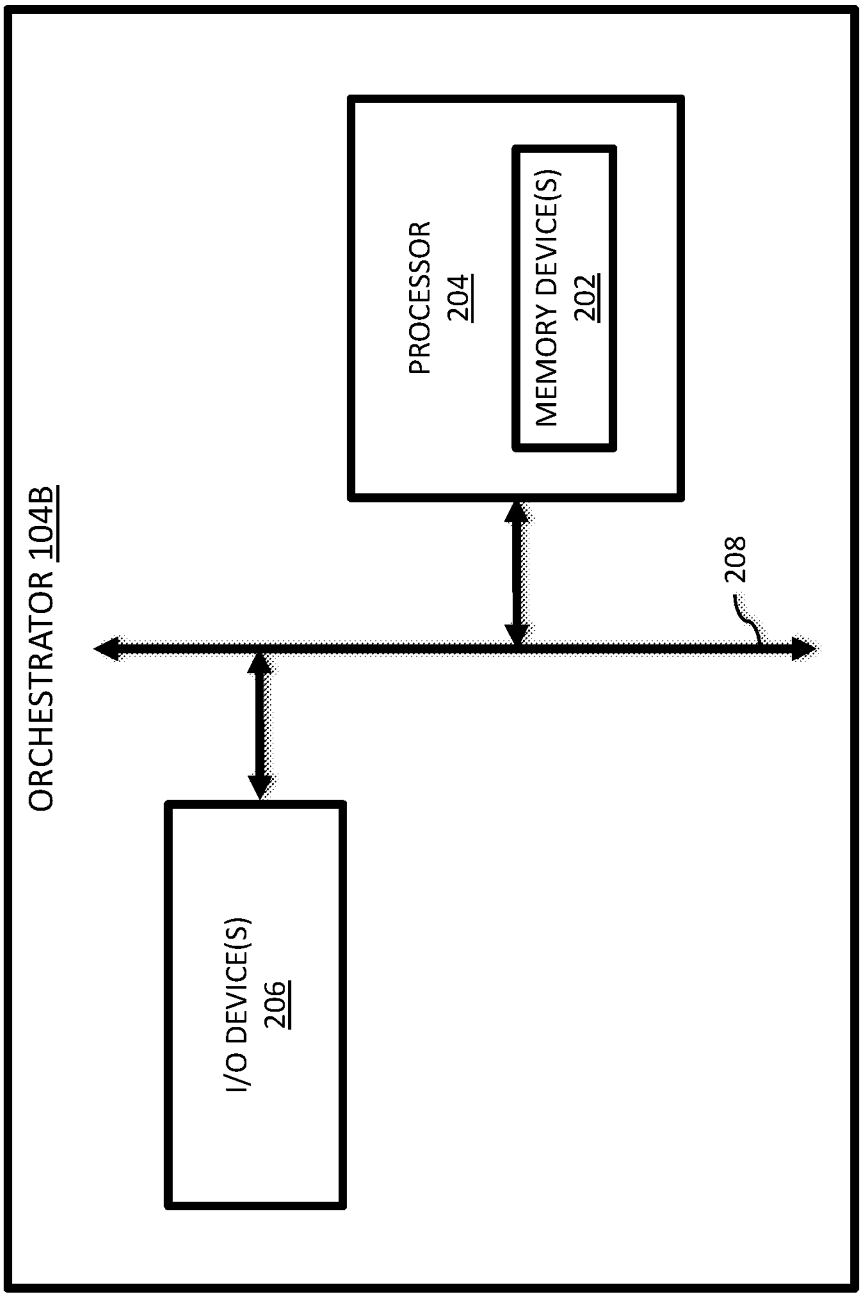

Turning now to FIG. 2B, FIG. 2B is a block diagram of another embodiment of an orchestrator 104B. The orchestrator 104B includes, among other components, one or more memory devices 202, a processor 204, and one or more I/O devices 206 similar to the orchestrator 104A discussed elsewhere herein. Alternative to the orchestrator 104A, the processor 204 in the orchestrator 104B includes the memory device 202 as opposed to the memory device 202 of the orchestrator 104A being a different device than and/or independent of the processor 204.

With reference again to FIG. 1, a system 106 may include any type of system that is known or developed in the future. Further, the system 106 can host and/or provide any type of software service(s) that is/are known or developed in the future.

Figure 6:
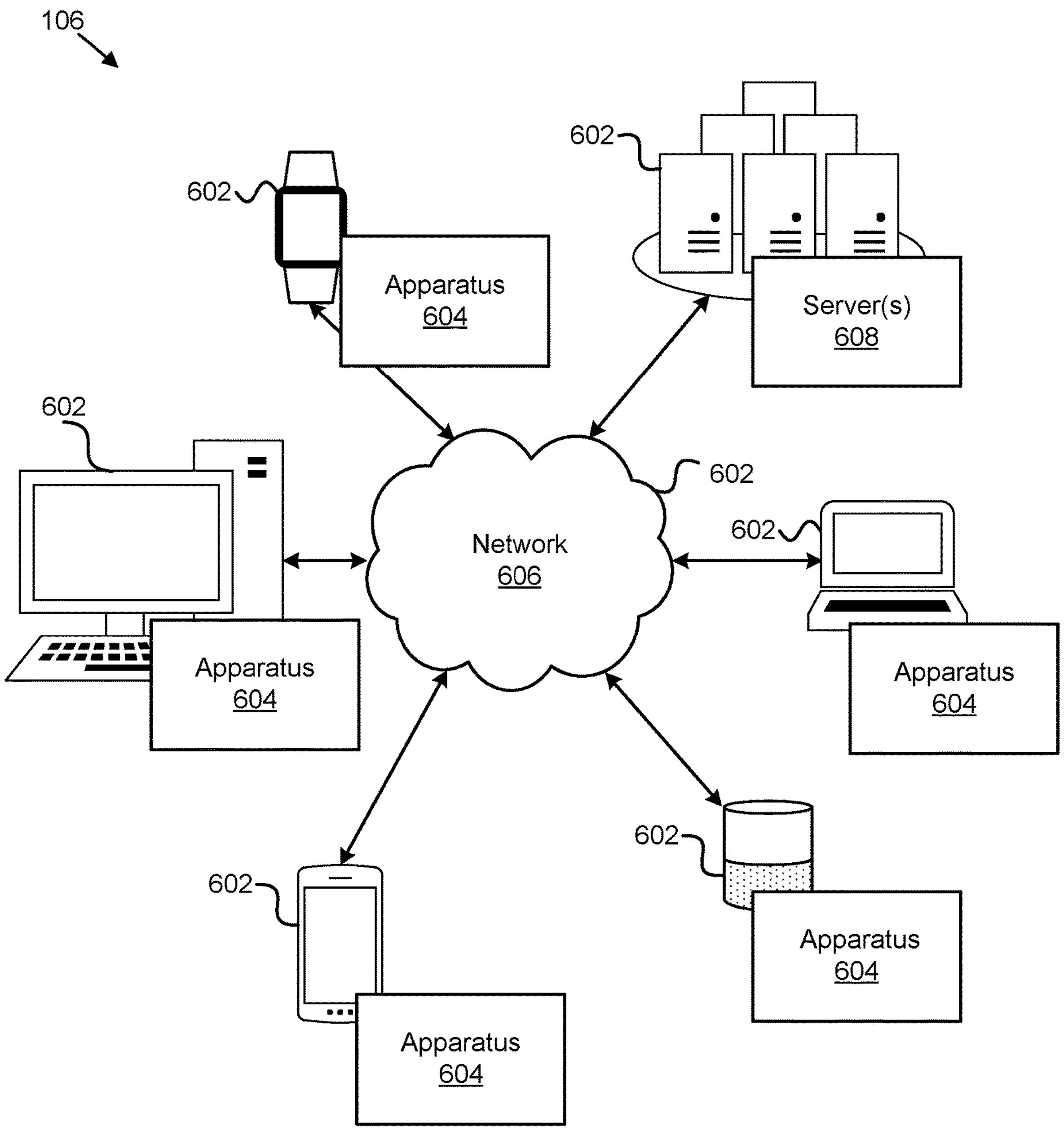
FIG. 6 is a schematic block diagram illustrating one embodiment of a system under test included in the system of FIG. 1.
Figure 7:
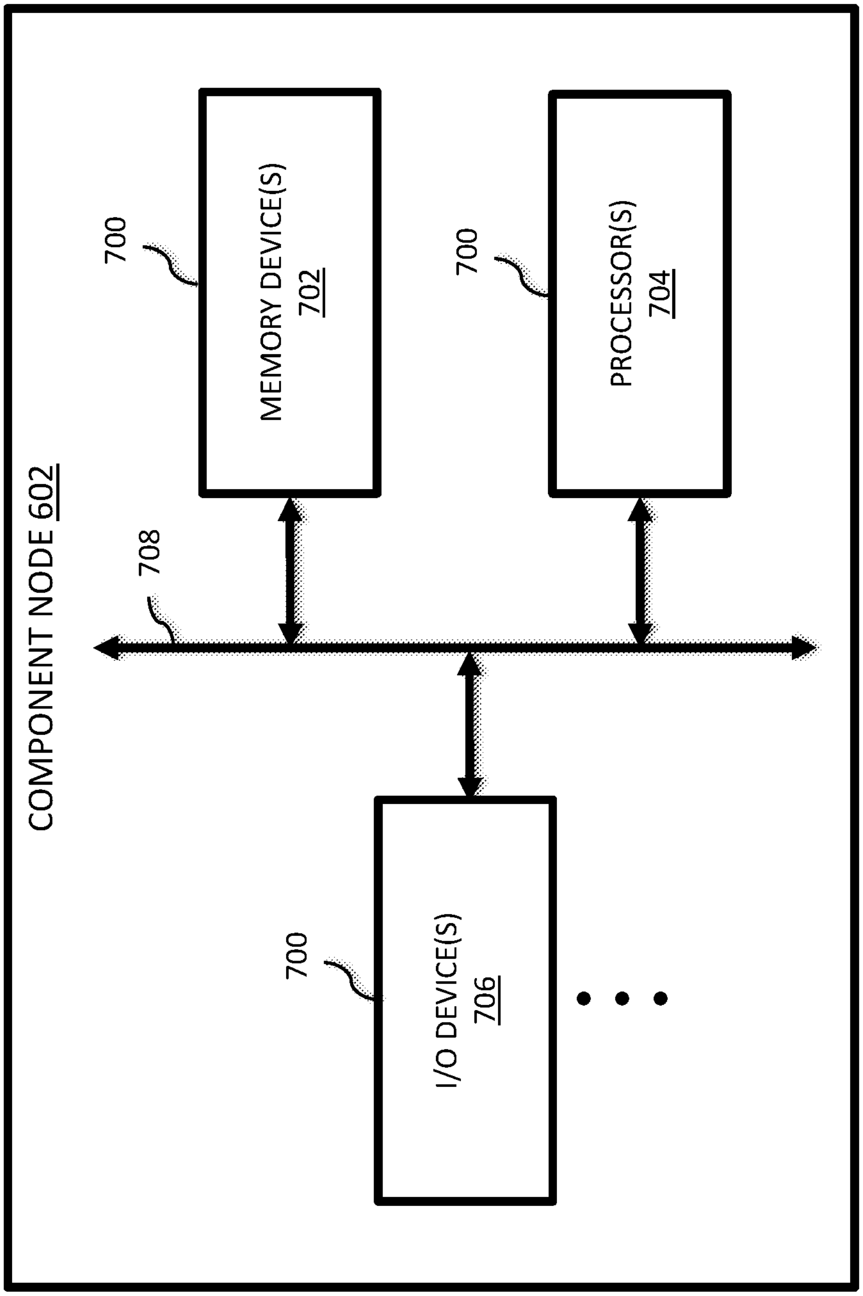
FIG. 7 is a schematic block diagram illustrating one embodiment of a component node included in the system under test of FIG. 6.

FIG. 6 is a diagram of one example embodiment of the system 106. The example illustrated in FIG. 6 is but one example of a system 106 and is not intended to limit the scope of the various embodiments disclosed herein in any way. That is, the embodiment of the system 106 is for use in understanding the spirit and scope of the various embodiments and other embodiments of the system 106 may include different configurations.

At least in the illustrated embodiments, the system 106 includes one or more component nodes 602, which can include one or more apparatuses 604 (e.g., information handling device(s)), one or more data networks 606, and/or one or more servers 608. In certain embodiments, even though a specific number of component nodes 602, apparatuses 604, data networks 606, and/or servers 608 are depicted in FIG. 6, one of skill in the art will recognize, in light of this disclosure, that any number of component nodes 602, apparatuses 604, data networks 606, and/or servers 608 may be included in the system 106.

The apparatuses 604 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a micro-controller, and/or another semiconductor integrated circuit device), a volatile memory, and/or a non-volatile storage medium, a display, a connection to a display, and/or the like.

In certain embodiments, the apparatuses 604 are configured to host, execute, facilitate, and/or the like various hardware and/or software applications. In such an embodiment, the apparatuses 604 may be equipped with speakers, microphones, display devices, and/or the like that are used to participate in, supervise, conduct, and/or the like various computing functions and/or operations.

The data network 606, in one embodiment, includes a digital communication network that transmits digital communications. The data network 606 may include a wireless network, such as a wireless cellular network, a local wireless network, such as a Wi-Fi network, a Bluetooth® network, a near-field communication ("NFC") network, an ad hoc network, and/or the like. The data network 606 may include a wide area network ("WAN"), a storage area network ("SAN"), a local area network ("LAN") (e.g., a home network), an optical fiber network, the internet, or other digital communication network. The data network 606 may include two or more networks. The data network 606 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 608, in one embodiment, may be embodied as blade servers, mainframe servers, tower servers, rack servers, and/or the like. The one or more servers 608 may be configured as mail servers, web servers, application servers, FTP servers, media servers, data servers, web servers, file servers, virtual servers, and/or the like. The one or more servers 608 may be communicatively coupled (e.g., networked) over a data network 606 to one or more apparatuses 604.

Figure 11:
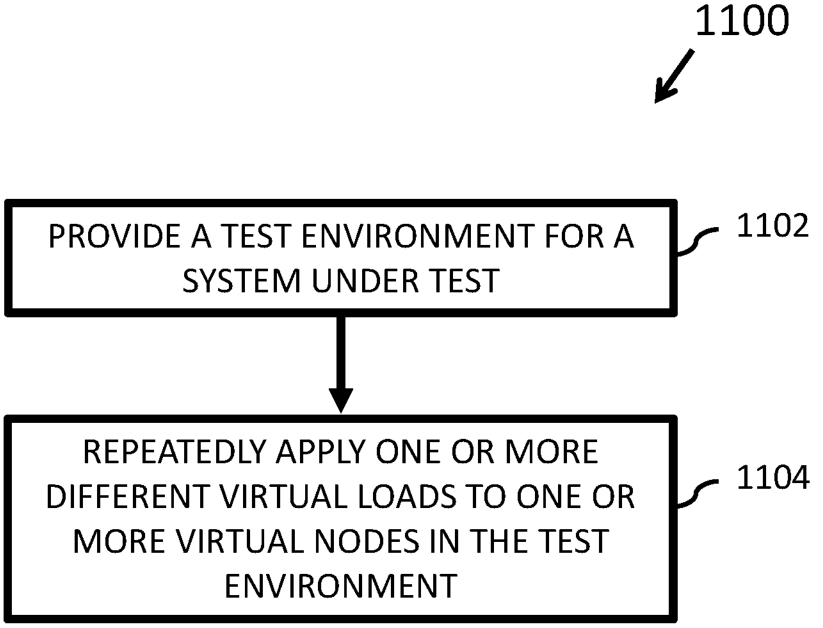
FIGS. 11 through 13 are schematic flow chart diagrams illustrating various embodiments of a method for generating scaled-down load test models for testing real-world loads.

FIG. 11 is a schematic flow chart diagram illustrating one embodiment of a method 1100 for generating a scaled-down load test models 308 for testing real-world loads. At least in the illustrated embodiment, the method 1100 begins by a processor (e.g., processor 204) providing a test environment 900 for a system 106 under test (block 1102). The test environment 900 may be manually generated by a user and/or automatedly generated by the processor 204, as discussed elsewhere herein.

The method 1100 further includes the processor 204 repeatedly applying one or more different virtual loads to one or more virtual nodes in the test environment 900 (block 1104). The operations of block 1104 may be performed by a machine learning algorithm, as discussed elsewhere herein.

Figure 12:
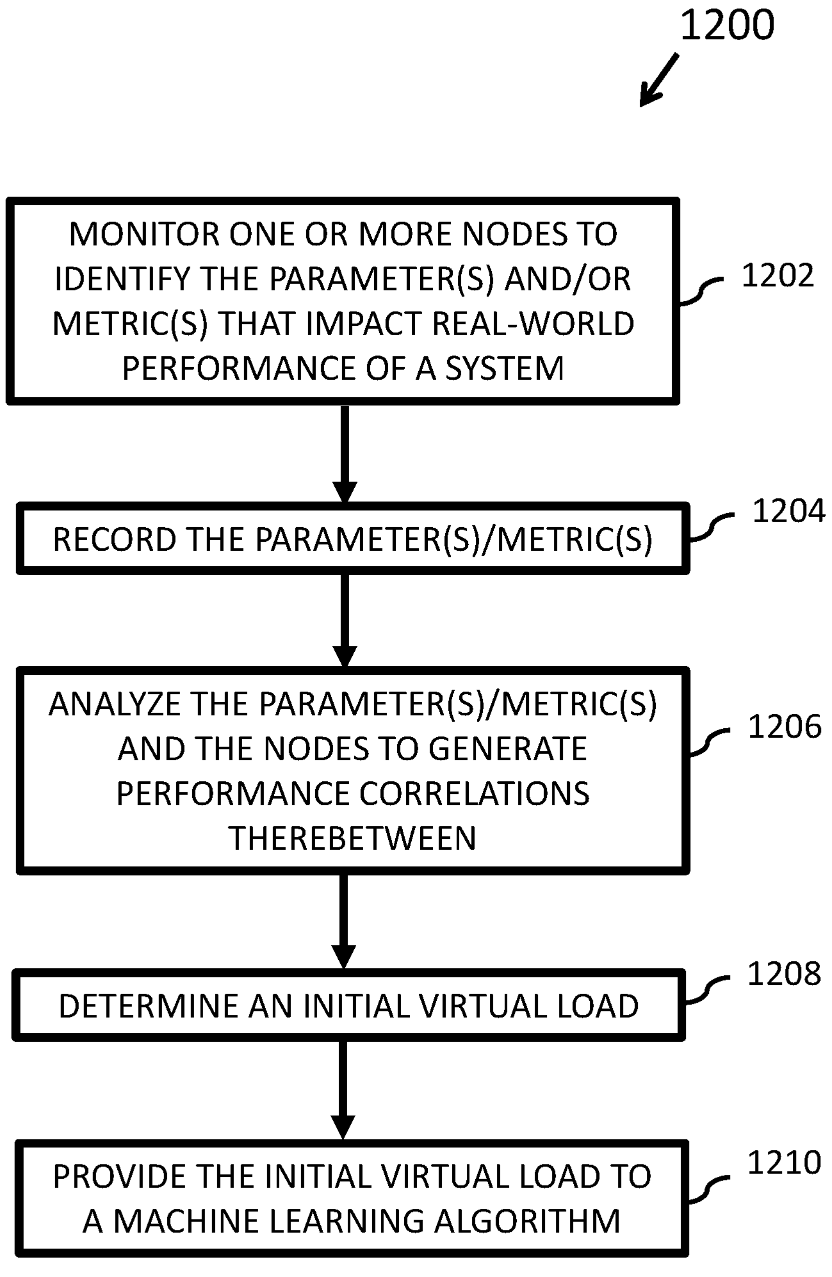

FIG. 12 is a schematic flow chart diagram illustrating one embodiment of a method 1200 that corresponds to one embodiment of the operations of block 1102 in the method 1100 for generating a scaled-down load test models 308 for testing real-world loads. At least in the illustrated embodiment, the method 1200 begins by the processor 204 monitoring one or more nodes in a system 106 to identify the parameter(s) and/or metric(s) that impact real-world performance of the system 106 (block 1202). The parameter(s) and/or metric(s) may then be recorded (block 1204).

The processor 204 analyzes the parameter(s)/metric(s) and the nodes to generate performance correlations between the parameter(s)/metric(s) and the nodes (block 1206). The processor 204 can utilize a machine learning algorithm can perform the analysis to draw the correlation(s), as discussed elsewhere herein.

The processor 204 determines an initial load for a test environment 900 (block 1208) and provides the initial load to a machine learning algorithm (block 1210). The various machine learning algorithms discussed herein may be the same of different machine learning algorithms.

Figure 13:
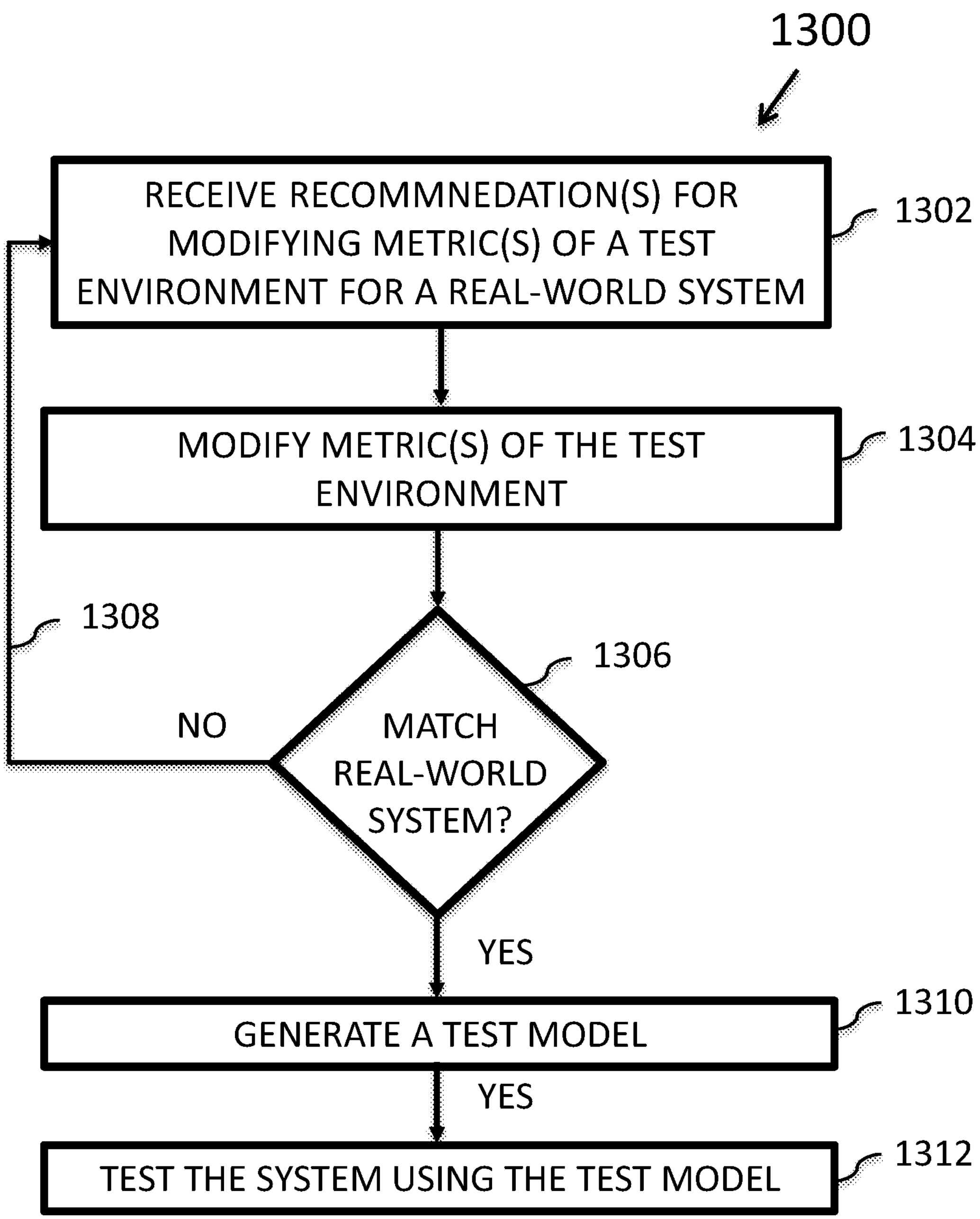

FIG. 13 is a schematic flow chart diagram illustrating another embodiment of a method 1300 for generating a scaled-down load test models 308 for testing real-world loads. At least in the illustrated embodiment, the method 1300 begins by a processor (e.g., processor 204) receiving one or more recommendations for modifying one or more metrics a test environment 900 for a system 106 under test (block 1302). The test environment 900 may be manually generated by a user and/or automatedly generated by the processor 204, as discussed elsewhere herein. The method 1300 further includes the processor 204 modifying the one or more metrics of the test environment 900 to generate an updated test environment 1000 in response to receiving the recommendation(s) (block 1304).

The processor determines whether the updated test environment 1000 matches the real-world performance of the system 106 (block 1306). In response to the updated test environment 1000 not matching the real-world performance of the system 106 (e.g., a "NO" in block 1306), the processor 204 notifies a machine learning algorithm so that the processor can perform another iteration of blocks 1302 through 1306 (return 1308). The operations of blocks 1302 through 1306 and return 1308 can be repeated until the updated test environment 1000 matches the real-world performance of the system 106 (e.g., a "YES" in block 1306).

In response to the updated test environment 1000 matching the real-world performance of the system 106 (e.g., a "YES" in block 1306), the processor 204 can generate a test model 308 that is based on the matching updated test environment 1000 (block 1310). A match can be determined as a full match or a substantial match, as discussed elsewhere herein. In certain embodiments, the processor 204 can test the system 106 using the generated test model 308 (block 1312).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:

a processor; and a memory configured to store code executable by the processor to:

generate a test environment for a system under test, the system under test including a CPU, a memory, an input/output (I/O) subsystem, and a plurality of nodes that collectively execute a workload, wherein:

the test environment comprises a virtual CPU configured to emulate a utilization behavior of the CPU, a virtual memory configured to emulate a capacity and access behavior of the memory, a virtual I/O subsystem configured to emulate a throughput behavior of the I/O subsystem, and a plurality of virtual nodes, each virtual node corresponding to a respective node in the plurality of nodes of the system under test, each virtual node functions under a virtual load similar to its corresponding node in the plurality of nodes functioning under a corresponding real-world load condition, and the test environment is generated based on data corresponding to a plurality of different load operations of the system, collect performance metric data from the system under test across a plurality of different real-world load operations, the performance metric data including measured CPU utilization, memory utilization, and I/O throughput values associated with each of the plurality of nodes, execute a first machine learning algorithm trained using the collected performance metric data to control application of virtual loads to the virtual nodes by iteratively applying one or more different virtual loads to each virtual node in the test environment and automatedly adjusting the virtual loads by constraining values of the virtual loads until virtual resource utilization of a particular scaled-down load test model converges with the utilization behavior of the CPU, the capacity and access behavior of the memory, and the throughput behavior of the I/O subsystem under a pre-defined real-world load condition, wherein:

each constrained value of the virtual loads applied to each virtual node is comparatively smaller relative to each of one or more corresponding real-world loads for each node of the plurality of nodes defining the pre-defined real-world load condition for the system, and each virtual load of the one or more different virtual loads applied to each virtual node is based on a specific constraint corresponding to each type of virtual node, and execute the particular scaled-down load test model to identify resource-specific undesirable conditions experienced by the system under test to enable modification of the system prior to exposing the system to real-world load conditions.

2. The apparatus of claim 1, wherein:

each node in the plurality of nodes includes one or more parameters that impacts performance of the system when each parameter is under the pre-defined real-world load;

the one or more parameters for each node corresponds to a metric for each particular node; and the executable code further causes the processor to:

monitor each node in the plurality of nodes to identify the one or more parameters in each node that has a greatest impact on the performance of the system when under a respective real-world load, and record the identified one or more parameters in each node that has the greatest impact on the performance of the system when under the respective real-world load.

3. The apparatus of claim 2, wherein the executable code further causes the processor to:

execute a second machine learning algorithm to:

iteratively analyze a correlation between one or more inputs and/or one or more outputs of the system and the recorded identified one or more parameters in each node that has the greatest impact on the performance of the system when under the respective real-world load, and determine an initial virtual load for the one or more parameters for each node that is comparatively smaller relative to the pre-defined real-world load for one or more corresponding parameters in each node defining the pre-defined real-world load based on the analyzed correlations; and provide the initial virtual load to the first machine learning algorithm for use as a first one of the one or more different virtual loads applied to each virtual node in the test environment, wherein the initial virtual load defines a best guess map for the test environment.

4. The apparatus of claim 1, wherein:

each virtual node in the plurality of virtual nodes includes one or more parameters that are affected by applying a respective virtual load to the one or more parameters; and executing utilizing the first machine learning algorithm to iteratively apply the one or more different virtual loads to the test environment comprises iteratively applying the one or more different virtual loads to each virtual node until the scaled-down load test model converges with the utilization behavior of the CPU, the capacity and access behavior of the memory, and the throughput behavior of the I/O subsystem of the system under the pre-defined real-world load.

5. The apparatus of claim 4, wherein iteratively applying the one or more different virtual loads to each virtual node comprises iteratively applying the one or more different virtual loads to each different virtual node until the scaled-down load test model converges with the utilization behavior of the CPU, the capacity and access behavior of the memory, and the throughput behavior of the I/O subsystem of the system under the pre-defined real-world load.

6. The apparatus of claim 5, wherein iteratively applying the one or more different virtual loads to each different virtual node comprises iteratively applying a plurality of different virtual loads to each of a plurality of different virtual nodes until the scaled-down load test model converges with the utilization behavior of the CPU, the capacity and access behavior of the memory, and the throughput behavior of the I/O subsystem of the system under the pre-defined real-world load.

7. The apparatus of claim 1, wherein: a first constraint for a first virtual node includes one of the same constraint or a different constraint than a previously applied first constraint for the first virtual node and a second constraint for a second virtual node includes a different constraint than a previously applied second constraint for the second virtual node in response to the previously applied first constraint and the previously applied second constraint not causing a previous scaled-down load test model to converge with the utilization behavior of the CPU, the capacity and access behavior of the memory, and the throughput behavior of the I/O subsystem of the system under the pre-defined real-world load.

8. A method, comprising:

generating, by a processor, a test environment for a system under test, the system under test including a CPU, a memory, an input/output (I/O) subsystem, and a plurality of nodes that collectively execute a workload, wherein:

the test environment comprises a virtual CPU configured to emulate a utilization behavior of the CPU, a virtual memory configured to emulate a capacity and access behavior of the memory, a virtual I/O subsystem configured to emulate a throughput behavior of the I/O subsystem, and a plurality of virtual nodes, each virtual node corresponding to a respective node in the plurality of nodes of the system under test, each virtual node functions under a virtual load similar to its corresponding node in the plurality of nodes functioning under a corresponding real-world load condition, and the test environment is generated based on data corresponding to a plurality of different load operations of the system;

collecting performance metric data from the system under test across a plurality of different real-world load operations, the performance metric data including measured CPU utilization, memory utilization, and I/O throughput values associated with each of the plurality of nodes;

executing a first machine learning algorithm trained using the collected performance metric data to control application of virtual loads to the virtual nodes by iteratively applying one or more different virtual loads to each virtual node in the test environment and automatedly adjusting the virtual loads by constraining values of the virtual loads until virtual resource utilization of a particular scaled-down load test model converges with the utilization behavior of the CPU, the capacity and access behavior of the memory, and the throughput behavior of the I/O subsystem under a pre-defined real-world load condition, wherein:

each constrained value of the virtual loads applied to each virtual node is comparatively smaller relative to each of one or more corresponding real-world loads for each node of the plurality of nodes defining the pre-defined real-world load condition for the system, and each virtual load of the one or more different virtual loads applied to each virtual node is based on a specific constraint corresponding to each type of virtual node; and executing the particular scaled-down load test model to identify resource-specific undesirable conditions experienced by the system under test to enable modification of the system prior to exposing the system to real-world load conditions.

9. The method of claim 8, wherein:

each node in the plurality of nodes includes one or more parameters that impacts performance of the system when each parameter is under the pre-defined real-world load;

the one or more parameters for each node corresponds to a metric for each particular node; and the method further comprises:

monitoring each node in the plurality of nodes to identify the one or more parameters in each node that has a greatest impact on the performance of the system when under a respective real-world load, and recording the identified one or more parameters in the one or more nodes that has the greatest impact on the performance of the system when under the respective real-world load.

10. The method of claim 9, further comprising:

executing a second machine learning algorithm to:

iteratively analyze a correlation between one or more inputs and/or one or more outputs of the system and the recorded identified one or more parameters in each node that has the greatest impact on the performance of the system when under the respective real-world load, and determine an initial virtual load for the one or more parameters for each node that is comparatively smaller relative to the pre-defined real-world load for one or more corresponding parameters in each node defining the pre-defined real-world load based on the analyzed correlations; and providing the initial virtual load to the first machine learning algorithm for use as a first one of the one or more different virtual loads applied to each virtual node in the test environment, wherein the initial virtual load defines a best guess map for the test environment.

11. The method of claim 8, wherein:

each virtual node in the plurality of virtual nodes includes one or more parameters that are affected by applying a respective virtual load to the one or more parameters; and executing the first machine learning algorithm to iteratively apply the one or more different virtual loads to the test environment comprises iteratively applying the one or more different virtual loads to each virtual node until the scaled-down load test model converges with the utilization behavior of the CPU, the capacity and access behavior of the memory, and the throughput behavior of the I/O subsystem of the system under the pre-defined real-world load.

12. The method of claim 11, wherein iteratively applying the one or more different virtual loads to each virtual node comprises iteratively applying the one or more different virtual loads to each different virtual node until the scaled-down load test model mimics converges with the utilization behavior of the CPU, the capacity and access behavior of the memory, and the throughput behavior of the I/O subsystem of the system under the pre-defined real-world load.

13. The method of claim 12, wherein iteratively applying the one or more different virtual loads to each different virtual node comprises iteratively applying a plurality of different virtual loads to each of a plurality of different virtual nodes until the scaled-down load test model converges with the utilization behavior of the CPU, the capacity and access behavior of the memory, and the throughput behavior of the I/O subsystem of the system under the pre-defined real-world load.

14. The method of claim 8, wherein: a first constraint for a first virtual node includes one of the same constraint or a different constraint than a previously applied first constraint for the first virtual node and a second constraint for a second virtual node includes a different constraint than a previously applied second constraint for the second virtual node in response to the previously applied first constraint and the previously applied second constraint not causing a previous scaled-down load test model to converge with the utilization behavior of the CPU, the capacity and access behavior of the memory, and the throughput behavior of the I/O subsystem of the system under the pre-defined real-world load.

15. A computer program product comprising a non-transitory computer-readable storage medium configured to store code executable by a processor, the executable code, when executed by the processor, causes the processor to:

generate a test environment for a system under test, the system under test including a CPU, a memory, an input/output (I/O) subsystem, and a plurality of nodes that collectively execute a workload, wherein:

the test environment comprises a virtual CPU configured to emulate a utilization behavior of the CPU, a virtual memory configured to emulate a capacity and access behavior of the memory, a virtual I/O subsystem configured to emulate a throughput behavior of the I/O subsystem, and a plurality of virtual nodes of the system under test, each virtual node corresponding to a respective node in the plurality of nodes, each virtual node functions under a virtual load similar to its corresponding node in the plurality of nodes functioning under a corresponding real-world load condition, and the test environment is generated based on data corresponding to a plurality of different load operations of the system;

collect performance metric data from the system under test across a plurality of different real-world load operations, the performance metric data including measured CPU utilization, memory utilization, and I/O throughput values associated with each of the plurality of nodes, execute a first machine learning algorithm trained using the collected performance metric data to control application of virtual loads to the virtual nodes by iteratively applying one or more different virtual loads to each virtual node in the test environment and automatedly adjusting the virtual loads by constraining values of the virtual loads until virtual resource utilization of a particular scaled-down load test model converges with the utilization behavior of the CPU, the capacity and access behavior of the memory, and the throughput behavior of the I/O subsystem under a pre-defined real-world load condition, wherein:

each constrained value of the virtual loads applied to each virtual node is comparatively smaller relative to each of one or more corresponding real-world loads for each node of the plurality of nodes defining the pre-defined real-world load condition for the system, and each virtual load of the one or more different virtual loads applied to each virtual node is based on a specific constraint corresponding to each type of virtual node; and execute the particular scaled-down load test model to identify resource-specific undesirable conditions experienced by the system under test to enable modification of the system prior to exposing the system to real-world load conditions.

16. The system computer program product of claim 15, wherein:

each node in the plurality of nodes includes one or more parameters that impacts performance of the system when each parameter is under the pre-defined real-world load;

the one or more parameters for each node corresponds to a metric for each particular node; and the executable code further causes the processor to:

monitor each node in the plurality of nodes to identify the one or more parameters in each node that has a greatest impact on the performance of the system when under a respective real-world load, and record the identified one or more parameters in each node that has the greatest impact on the performance of the system when under the respective real-world load.

17. The computer program product of claim 16, wherein the executable code further causes the processor to:

execute a second machine learning algorithm to:

iteratively analyze a correlation between one or more inputs and/or one or more outputs of the system and the recorded identified one or more parameters in each node that has the greatest impact on the performance of the system when under the respective real-world load;

determine an initial virtual load for the one or more parameters for each node that is comparatively smaller relative to the pre-defined real-world load for one or more corresponding parameters in each node defining the pre-defined real-world load based on the analyzed correlations; and provide the initial virtual load to the first machine learning algorithm for use as a first one of the one or more different virtual loads applied to each virtual node in the test environment, wherein the initial virtual load defines a best guess map for the test environment.

18. The computer program product of claim 15, wherein: a first constraint for a first virtual node includes one of the same constraint or a different constraint than a previously applied first constraint for the first virtual node and a second constraint for a second virtual node includes a different constraint than a previously applied second constraint for the second virtual node in response to the previously applied first constraint and the previously applied second constraint not causing a previous scaled-down load test model to converge with the utilization behavior of the CPU, the capacity and access behavior of the memory, and the throughput behavior of the I/O subsystem of the system under the pre-defined real-world load.

* * * * *